US008846599B2

(12) United States Patent
Haberecht et al.

(10) Patent No.: US 8,846,599 B2
(45) Date of Patent: *Sep. 30, 2014

(54) BRANCHED POLYESTERS WITH SULFONATE GROUPS

(75) Inventors: Monika Haberecht, Ludwigshafen (DE); Frank Rittig, Worms (DE); Bernd Bruchmann, Freinsheim (DE); Claudia Esper, Kindenheim (DE); Roland Ettl, Altlussheim (DE); Karl Kolter, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,444

(22) Filed: Jun. 13, 2012

(65) Prior Publication Data

US 2012/0322714 A1 Dec. 20, 2012

Related U.S. Application Data

(60) Provisional application No. 61/497,099, filed on Jun. 15, 2011.

(51) Int. Cl.
*C11D 1/00* (2006.01)
*B08B 3/04* (2006.01)
*C11D 3/37* (2006.01)
*C08G 63/91* (2006.01)
*C08G 63/688* (2006.01)

(52) U.S. Cl.
CPC .............. *C11D 3/378* (2013.01); *C08G 63/918* (2013.01); *C08G 63/6888* (2013.01)
USPC ........... 510/475; 510/276; 510/476; 510/492; 525/344; 525/447; 8/137

(58) Field of Classification Search
USPC .......... 510/475, 476, 492, 276; 525/344, 447; 8/137
See application file for complete search history.

(56) References Cited

U.S. PATENT DOCUMENTS

| | | | |
|---|---|---|---|
| 3,234,258 | A | 2/1966 | Morris |
| 4,150,216 | A | 4/1979 | Quack et al. |
| 4,167,395 | A * | 9/1979 | Engelhardt et al. ............... 8/557 |
| 4,746,456 | A | 5/1988 | Kud et al. |
| 5,075,041 | A | 12/1991 | Lutz |
| 5,227,446 | A | 7/1993 | Denzinger et al. |
| 5,281,630 | A | 1/1994 | Salsman |
| 5,399,286 | A | 3/1995 | Funhoff et al. |
| 2012/0053303 | A1 | 3/2012 | Djuric et al. |
| 2012/0129749 | A1 | 5/2012 | Detering et al. |
| 2012/0129750 | A1 | 5/2012 | Detering et al. |

FOREIGN PATENT DOCUMENTS

| | | |
|---|---|---|
| DE | 26 21 653 A1 | 12/1977 |
| DE | 26 33 418 A1 | 1/1978 |
| DE | 26 37 926 A1 | 3/1978 |
| DE | 39 05 915 A1 | 9/1990 |
| DE | 41 06 355 A1 | 9/1992 |
| DE | 43 13 909 A1 | 11/1994 |
| DE | 43 19 671 A1 | 12/1994 |
| DE | 43 19 672 A1 | 12/1994 |
| DE | 44 15 623 A1 | 11/1995 |
| DE | 195 19 042 A1 | 11/1996 |
| EP | 0 013 836 A1 | 8/1980 |
| EP | 0 001 004 B1 | 2/1982 |
| EP | 0 396 303 A2 | 11/1990 |
| EP | 0 451 508 A1 | 10/1991 |
| EP | 0 454 126 A1 | 10/1991 |
| EP | 0 511 037 A1 | 10/1992 |
| EP | 0 581 452 A1 | 2/1994 |
| EP | 0 656 914 A1 | 6/1995 |
| EP | 1 035 194 A2 | 9/2000 |
| FR | 1.156.513 | 5/1958 |
| GB | 839407 | 6/1960 |
| GB | 873214 | 7/1961 |
| JP | 58-217598 A | 12/1983 |
| WO | WO 90/13533 A1 | 11/1990 |
| WO | WO 92/16493 A1 | 10/1992 |
| WO | WO 93/22362 A1 | 11/1993 |
| WO | WO 94/01486 A1 | 1/1994 |
| WO | WO 94/04585 A1 | 3/1994 |
| WO | WO 95/07331 A1 | 3/1995 |
| WO | WO 2006/016035 A1 | 2/2006 |
| WO | WO 2009/019225 A2 | 2/2009 |

OTHER PUBLICATIONS

U.S. Appl. No. 13/495,512, filed Jun. 13, 2012, Haberecht, et al.
Helmut W. Stache, "Anionic Surfactants: Organic Chemistry", Marcel Dekker, Inc., Chapter 9: Sulfosuccinates by A. Domsch and B. Irrgang, 1996, 51 pages.
International Search Report issued Oct. 5, 2012, in PCT/EP2012/060848 (with English Translation of Categories of Cited Documents).

* cited by examiner

*Primary Examiner* — Brian P Mruk
(74) *Attorney, Agent, or Firm* — Oblon, Spivak, McClelland, Maier & Neustadt, L.L.P.

(57) ABSTRACT

Branched polyesters with sulfonate groups obtainable by the reaction of the components A, B, optionally C and optionally D to give branched polyesters, where the component A is selected from the group of $\alpha,\beta$-olefinically unsaturated dicarboxylic acids, and the component B is selected from the group of tri- or higher-functional alcohols, the optional component C is selected from the group of difunctional alcohols or of difunctional carboxylic acids without $\alpha,\beta$-olefinically unsaturated bonds, the optional component D is selected from fatty acids or fatty alcohols, and the subsequent reaction of the resulting branched polyesters with hydrogen sulfite, where the molar amount of hydrogen sulfite is at most 95 mol %, based on the amount of $\alpha,\beta$-olefinically unsaturated dicarboxylic acid.

16 Claims, No Drawings

BRANCHED POLYESTERS WITH SULFONATE GROUPS

This application claims the benefit of priority to Provisional application U.S. 61/497,099 filed on Jun. 15, 2011.

The present invention relates to branched polyesters with sulfonate groups and mixtures comprising branched polyesters with sulfonate groups. The invention further provides a method for producing such branched polyesters. Furthermore, the invention relates to the use of these branched polyesters as soil release polymers and graying inhibitors, for example in the cleaning of textiles, as textile auxiliaries and cleaners for hard surfaces.

Further embodiments of the present invention can be found in the claims, the description and the examples. It goes without saying that the features of the subject matter according to the invention that have been specified above and are still to be explained below can be used not only in the combination specifically stated in each case, but also in other combinations, without departing from the scope of the invention. In particular, also those embodiments of the present invention in which all of the features of the subject matter according to the invention have the preferred or very preferred meanings are preferred or very preferred.

Branched copolyesters comprising sulfonate groups which are soluble or can be dispersed in water are known from DE 26 21 653 A1. These branched copolyesters are suitable, according to DE 26 21 653 A1, as leveling auxiliaries in polyester dyeing, in particular for rapid dyeing methods, as hair-setting compositions, as sizes, as water-soluble adhesives and as additive for adhesives, and also as modifiers for melamine resins or other aminoplastic resins.

DE 26 33 418 A1 describes hair treatment compositions with a content of water-soluble or -dispersible branched copolyesters comprising sulfonate groups.

DE 26 37 926 A1 describes water-soluble or -dispersible and branched copolyesters comprising sulfonate groups with an application spectrum comparable to DE 26 21 653 A1.

U.S. Pat. No. 5,281,630 describes a prepolymer based on a terephthalic polymer, glycol and oxyalkylated polyol, which is reacted with α,β-unsaturated dicarboxylic acids and is then sulfonated.

Alemdar et al. describe in Polymer 51 (2010), pp. 5044-5050, the production of unsaturated polyesters using boric acid as catalyst and sulfonated derivatives of the unsaturated polyesters as biodegradable polymeric surface-active substances.

DE 39 05 915 A1 relates to a coating composition comprising addition polymers, crosslinking agents and an acid catalyst. Hydroxyl-comprising succinic acid diestersulfonic acids and succinic acid polyestersulfonic acids are described as acid catalysts.

Simple sulfosuccinates, for example mono- or dialkyl sulfosuccinates or sulfosuccinamides, have already been well-known to the person skilled in the art from the prior art since 1930.

These sulfosuccinates are used, for example, in cleaning compositions, pharmaceuticals, adhesives or coatings. However, polymeric sulfosuccinates are barely used.

An overview of the fields of use of sulfosuccinates can be found, for example, in Anionic Surfactants: Organic Chemistry, edited by H. W. Stache, Marcel Dekker, New York, 1996: Chapter 9: Sulfosuccinates by A. Domsch, and B. Irrgang.

Soil release polymers have been the subject of intense development work for many years. Originally developed as textile auxiliaries for the finishing of synthetic fibers, in particular polyester fibers, they are nowadays also used as so-called washing auxiliaries in detergents and cleaners for household laundry. Common names for soil-releasing compounds of this type are "Soil Release Polymers" or "Soil Repellents", because they impart soil-repelling properties to the treated surfaces.

The majority of the soil release polymers are polyesters based on terephthalic acid, polyalkylene glycols and monomeric glycols.

EP 1 035 194 A2 relates to the use of soil release comb polymers in detergents and cleaners.

Also known from EP 1 035 194 A2 (paragraph [0005]) are soil release polyesters, which can comprise anionic groups such as, for example, sulfonate groups.

The redeposition of dirt on textile fibers during the washing process is a constant challenge for the users. Consequently, additives which help to reduce this redeposition are in-demand additives, for example for detergents. In the past, high-performance additives were developed for powder detergents, but these no longer fully comply with modern requirements (e.g. formulatability in liquid detergents).

It was therefore the object of the invention to provide substances which can be used for cleaning purposes, in particular as additive to cleaner formulations for the treatment of textiles and household laundry. The object of the invention was also to provide polymeric effect substances by means of a technically simple and cost-effective method which have a large number of carboxyl groups and/or sulfonic acid groups and consist of monomers of low toxicity. It was a further object of the invention to provide substances which can easily be incorporated into formulations for cleaning purposes in their various presentation forms.

As is evident from the disclosure of the present invention, these and other objects are achieved by the various embodiments of the branched polyesters with sulfonate groups according to the invention, which are obtainable by a. the reaction of the components A, B, optionally C and optionally D to give branched polyesters, where
   i. the component A is selected from the group of α,β-olefinically unsaturated dicarboxylic acids ($A_2$), and
   ii. the component B is selected from the group of tri- or higher-functional alcohols ($B_y$),
   iii. the optional component C is selected from the group of difunctional alcohols ($B_2$) or the difunctional carboxylic acids ($C_2$) without α,β-olefinically unsaturated bonds,
   iv. the optional component D is selected from fatty acids or fatty alcohols,
b. and the subsequent reaction of the branched polyesters obtained in (a.) with hydrogen sulfite, where the molar amount of hydrogen sulfite is at most 95 mol %, based on the amount of α,β-olefinically unsaturated dicarboxylic acid ($A_2$).

Surprisingly, it has inter alia been found that these branched polyesters with sulfonate groups reduce the redeposition of dirt and the graying of polyester fibers.

In the reaction of the components A, B, optionally C and optionally D to give branched polyesters, it is of course also possible to use mixtures of different components A, mixtures of different components B, optionally mixtures of different components C and/or optionally mixtures of different components D. Preference is given to using mixtures with up to three different components A, mixtures with up to three different components B and/or optionally mixtures with up to three different components C. Particular preference is given to using mixtures with up to two different components A, mixtures with up to two different components B and/or optionally mixtures with up to two different components C. In particular, in the reaction of the components A, B, optionally C and optionally D to give branched polyesters, preference is given to using in each case one compound A, B and optionally C.

The carboxylic acids ($C_2$) of component C carry no sulfonic acid or sulfonate groups.

The branched polyesters with sulfonate groups of the invention are preferably dendritic, in particular hyperbranched, polyesters.

The term dendritic polymer or else highly branched polymer is the generic term for a series of different branched molecular structures. It covers, for example, dendrimers, star polymers and hyperbranched polymers.

Dendrimers are formed starting from a center (as a rule a small molecule with a plurality of reactive end groups), onto which, through a constantly repeating controlled reaction sequence, generation upon generation of a branching monomer is attached. Thus, with each reaction step, the number of monomer end groups in the resulting dendrimer increases exponentially. A characteristic feature of the dendrimers is the number of reaction stages (generations) carried out in their construction. On account of the uniform structure (in the ideal case all of the branches comprise exactly the same number of monomer units), dendrimers are essentially monodisperse, i.e. they generally have a defined molar mass. Molecularly as well as structurally uniform highly branched polymers are referred to below as dendrimers for consistency.

Within the context of this invention, "hyperbranched polymers" are highly branched polymers which, in contrast to the dendrimers specified above, are both molecularly and also structurally nonuniform. Hyperbranched polymers therefore have a nonuniform molar mass distribution (polydispersity). To produce hyperbranched polymers, a distinction is made between various synthesis strategies. An overview of possible synthesis methods can be found in C. Gao, D. Yan, Prog. Polym. Sci. 29 (2004), 183.

As regards the definition of dendritic and hyperbranched polymers, see also P. J. Flory, J. Am. Chem. Soc. 1952, 74, 2718 and H. Frey et al., Chemistry—A European Journal, 2000, 6, No. 14, 2499.

Dendritic polymers can be characterized via their "degree of branching". As regards the definition of the "degree of branching", reference is made to H. Frey et al., Acta Polym. 1997, 48, 30. The degree of branching DB here is defined as DB (%)=(T+Z)/(T+Z+L)×100, where T is the average number of terminally bonded monomer units, Z is the average number of monomer units forming branches, L is the average number of the linearly bonded monomer units.

Dendrimers have in general a degree of branching DB of at least 99%, specifically 99.9 to 100%.

Hyperbranched polymers preferably have a degree of branching DB of from 10 to 95%, preferably 25 to 90% and in particular 30 to 80%.

The branched polyesters used according to the invention preferably have a degree of branching (DB) per molecule of from 10 to 95%, preferably from 10 to 90%, particularly preferably from 10 to 80%, and in particular 20 to 80%.

Within the context of this invention, hyperbranched polyesters with or without sulfonate groups are understood as meaning uncrosslinked polyesters with or without sulfonate groups which are both structurally and molecularly nonuniform. Within the context of this specification, uncrosslinked means that a degree of crosslinking of less than 15% by weight, preferably of less than 10% by weight, determined over the insoluble fraction of the polymer, is present.

The insoluble fraction of the polymer was determined by extraction for four hours in a Soxhlet apparatus with a solvent in which the polymer is soluble, for example tetrahydrofuran, dimethylacetamide or hexafluoroisopropanol, preferably tetrahydrofuran. After drying the residue to constant weight, the remaining residue is weighed.

In a preferred embodiment, the branched polyesters with sulfonate groups according to the invention are obtained using component D, where preferably less than 20 mol % of component D, based on the total amount of components A, B, C and D, are used. Preference is given here to using less than 10 mol % of component D, and very particular preference is given to using less than 5 mol %. Preferably, component D is selected from fatty acids or fatty alcohols.

Suitable fatty acids or fatty alcohols can comprise 8 to 30 carbon atoms, preferably 12 to 25, and particularly preferably 16 to 20, carbon atoms.

Examples of suitable fatty acids are octanoic acid, isononanoic acid, capric acid, undecanoic acid, lauric acid, myristic acid, pentadecanoic acid, palmitic acid, margaric acid, stearic acid, nonadecanoic acid, arachic acid, behenic acid, oleic acid, linoleic acid, linolenic acid, benzoic acid, α- or β-naphthalenic acid.

In a preferred embodiment of the branched polyesters with sulfonate groups, the fraction of the tri- or higher-functional component B in step a. is at least 30 mol %, based on the total amount of the components A, B, C and D, particularly preferably at least 35 mol % and very particularly preferably at least 40 mol %.

In a further preferred embodiment of the branched polyesters with sulfonate groups, in step a., at least 5 mol % of components A are used, based on the total amount of components A, B, C and D. Preference is given here to using at least 10 mol %. Preferably, the fraction of component A, based on the total amount of components A, B, C and D, is at most 60 mol %, preferably at most 50 mol % and very particularly preferably at most 40 mol %.

Within the context of the branched polyesters with sulfonate groups according to the invention, the amount of hydrogen sulfite in step b can vary within a wide range depending on the particular application. Further, preference is given to using 10 to 95 mol %, particularly preferably from 20 to 92 mol % and in particular from 30 to 90 mol %, of hydrogen sulfite, based on the amount of α,β-olefinically unsaturated dicarboxylic acids ($A_2$).

The molecular weight of the branched polyesters were determined prior to the reaction with hydrogen sulfite by means of gel permeation chromatography (GPC) compared with polymethyl methacrylate (PMMA) as standard. For this, dimethylacetamide or tetrahydrofuran were used as eluents. The method is described in Analytiker Taschenbuch [Analytical handbook] Vol. 4, pages 433-442, Berlin 1984.

The thus determined weight-average molecular weights ($M_w$) of the polyesters A before the reaction with hydrogen sulfite are in the range from 500 g/mol to 50 000 g/mol, preferably in the range from 750 g/mol to 25 000 g/mol and very particularly preferably in the range from 1000 g/mol to 15 000 g/mol.

The branched polyesters prior to the reaction with hydrogen sulfite have acid numbers of from 10 to 500 mg KOH/g polymer, preferably 15 to 400 mg KOH/g polymer and very particularly preferably 20 to 300 mg KOH/g polymer. The acid number was determined in accordance with DIN 53402.

The branched polyesters A prior to the reaction with hydrogen sulfite have glass transition temperatures in the range from −50 to +50° C., preferably −40 to +40° C. and very particularly preferably −30 to +40° C. The glass transition temperature is determined by means of DSC (Differential Scanning calorimetry).

Preferably, for the branched polyesters with sulfonate groups, the α,β-olefinically unsaturated dicarboxylic acids ($A_2$) used are maleic acid, itaconic acid, fumaric acid, citraconic acid, mesaconic acid or glutaconic acid. Particular preference is given to maleic acid and itaconic acid, very particularly preferably maleic acid and derivatives thereof such as maleic anhydride.

The dicarboxylic acids ($A_2$) can either be used as such or in the form of derivatives.

Derivatives of the dicarboxylic acids ($A_2$) are preferably understood here as meaning the relevant anhydrides in monomeric or polymeric form, mono- or dialkyl esters, preferably mono- or di-$C_1$-$C_4$-alkyl esters, particularly preferably mono- or dimethyl esters or the corresponding mono- or diethyl esters, also mono- and divinyl esters, and mixed esters, preferably mixed esters with different $C_1$-$C_4$-alkyl components, particularly preferably mixed methyl ethyl esters.

Among these, the anhydrides and the mono- or dialkyl esters are preferred, particular preference being given to the anhydrides and the mono- or di-$C_1$-$C_4$-alkyl esters and very particular preference being given to the anhydrides.

Within the context of this specification, $C_1$-$C_4$-alkyl is methyl, ethyl, isopropyl, n-propyl, n-butyl, isobutyl, sec-butyl or tert-butyl, preferably methyl, ethyl and n-butyl, particularly preferably methyl and ethyl and very particularly preferably methyl.

Within the context of the present invention, it is also possible to use a mixture of a dicarboxylic acid and one or more of its derivatives. Equally, within the context of the present invention, it is possible to use a mixture of two or more different derivatives of one or more dicarboxylic acids.

Preferably, for the branched polyesters with sulfonate groups, the tri- or higher-functional alcohols ($B_y$ where y is greater than or equal to 3) used are glycerol, trimethylolmethane, trimethylolethane, trimethylolpropane, bis(trimethylolpropane), trimethylolbutane, trimethylolpentane, 1,2,4-butanetriol, 1,2,6-hexanetriol, tris(hydroxymethyl)-amine, tris(hydroxyethyl)amine, tris(hydroxypropyl)amine, pentaerythritol, diglycerol, triglycerol or higher condensation products of glycerol, di(trimethylolpropane), di(pentaerythritol), tris(hydroxymethyl)isocyanurate, tris(hydroxyethyl)isocyanurate (THEIC), tris(hydroxypropyl)-isocyanurate, sugars or sugar alcohols such as, for example, glucose, fructose or sucrose, sugar alcohols such as e.g. sorbitol, mannitol, threitol, erythritol, adonitol (ribitol), arabitol (lyxitol), xylitol, dulcitol (galactitol), maltitol, isomalt, or inositol tri- or higher-functional polyetherols based on tri- or higher-functional alcohols, which are obtained by reaction with ethylene oxide, propylene oxide and/or butylene oxide, particularly preferably with propylene oxide, or tri- or higher-functional polyesterols based on tri- or higher-alcohols, which are obtained by reaction with caprolactone.

The tri- or higher-functional alcohols ($B_y$ where y is greater than or equal to 3) particularly preferably used here are glycerol, diglycerol, triglycerol, trimethylolethane, trimethylolpropane, di(trimethylolpropane), pentaerythritol, sucrose or sorbitol, and also polyetherols thereof based on ethylene oxide and/or propylene oxide and in particular glycerol, diglycerol, triglycerol, trimethylolethane, trimethylolpropane, pentaerythritol or polyetherols thereof based on propylene oxide.

For the branched polyesters with sulfonate groups, the difunctional carboxylic acids ($C_2$) without α,β-olefinically unsaturated bonds preferably used are aliphatic dicarboxylic acids, such as oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid, aromatic dicarboxylic acids, such as phthalic acid, isophthalic acid or terephthalic acid.

The specified dicarboxylic acids can also be substituted with one or more radicals, selected from $C_1$-$C_{20}$-alkyl groups, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, trimethylpentyl, n-nonyl, n-decyl, n-dodecyl, n-tetradecyl, n-hexadecyl, n-octadecyl or n-eicosyl, $C_2$-$C_{20}$-alkenyl groups, for example butenyl, hexenyl, octenyl, decenyl, dodecenyl, tetradecenyl, hexadecenyl, octadecenyl or eicosenyl, $C_3$-$C_{12}$-cycloalkyl groups, for example cyclopropyl, cyclobutyl, cyclopentyl, cyclohexyl, cycloheptyl, cyclooctyl, cyclononyl, cyclodecyl, cycloundecyl and cyclododecyl; preference being given to cyclopentyl, cyclohexyl and cycloheptyl;

alkylene groups such as methylene or ethylidene or $C_6$-$C_{14}$-aryl groups such as, for example, phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl.

Examples of representatives of substituted dicarboxylic acids or derivatives thereof which may be mentioned are: 2-methylmalonic acid, 2-ethylmalonic acid, 2-phenylmalonic acid, 2-methyl-succinic acid, 2-ethylsuccinic acid, 2-phenylsuccinic acid, 3,3-dimethylglutaric acid, dodecenylsuccinic acid, hexadecenylsuccinic acid, octadecenylsuccinic acid, and also reaction products of polyisobutylenes with an enophile selected from the group fumaryl dichloride, fumaric acid, maleoyl dichloride, maleic anhydride and/or maleic acid, preferably with maleic anhydride or maleoyl dichloride, particularly preferably with maleic anhydride, to give succinic acid derivatives substituted with polyisobutylene, in which the polyisobutylenyl group can have a number-average molecular weight $M_n$ of from 100 to 100 000 daltons. This reaction takes place by the methods known to the person skilled in the art and preferably as described in the German laid-open specifications DE-A 195 19 042, therein preferably from p. 2, l. 39 to p. 4, l. 2 and particularly preferably from p. 3, ll. 35-58, and DE-A 43 19 671, therein preferably from p. 2, l. 30 to l. 68, and DE-A 43 19 672, therein preferably from p. 2, l. 44 to p. 3, l. 19, described methods for the reaction of polyisobutylenens with enophiles.

Furthermore, mixtures of two or more of the aforementioned dicarboxylic acids can be used. For example, one to six, preferably one to four, particularly preferably one to three, very particularly preferably one to two and especially one, dicarboxylic acid can be used.

The dicarboxylic acids can be used either as such or in the form of derivatives.

Derivatives are preferably understood as meaning the relevant anhydrides in monomeric or polymeric form, mono- or dialkyl esters, preferably mono- or di-$C_1$-$C_4$-alkyl esters, particularly preferably mono- or dimethyl esters or the corresponding mono- or diethyl esters, also mono- and divinyl esters, and also mixed esters, preferably mixed esters with different $C_1$-$C_4$-alkyl components, particularly preferably mixed methyl ethyl esters.

Among these, the anhydrides and the mono- or dialkyl esters are preferred, particular preference being given to the anhydrides and the mono- or di-$C_1$-$C_4$-alkyl esters and very particularly preferably being given to the anhydrides.

For the branched polyesters with sulfonate groups as difunctional carboxylic acids ($C_2$) without α,β-olefinically unsaturated bonds, particular preference is given to using aliphatic dicarboxylic acids, such as oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, dodecenylsuccinic acid, hexadecenylsuccinic acid or octa-decenylsuccinic acid.

For the branched polyesters with sulfonate groups as difunctional alcohols ($B_2$) without α,β-olefinically unsaturated bonds, preference is given to using ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)cyclohexanes, neopentyl glycol, (2)-methyl-2,4-pentanediol, 2,4-di-methyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, isosorbide, dipropylene glycol, tripropylene glycol, polyethylene glycols HO($CH_2CH_2O$)$_n$—H, polypropylene glycols HO(CH[$CH_3$]$CH_2O$)$_n$—H, polybutylene glycols HO(CH[$C_3$]$CH_2CH_2O$)$_n$—H, where n is an integer and n is ≥4, preferably n is an integer from the range from 4 to 40, particularly preferably from 4 to 20, polyethylene polypropylene glycols, where the order of the ethylene oxide or propylene oxide units can be blockwise or random, or polytetramethylene glycols, poly-1,3-propanediols or polycaprolactones with a molecular weight of up to 5000 g/mol, preferably with a molecular weight up to 2000 g/mol.

As difunctional alcohols ($B_2$), particular preference is given here to using polyethylene glycols HO($CH_2CH_2O$)$_n$—H, polypropylene glycols HO(CH[$CH_3$]$CH_2O$)$_n$—H, polybutylene glycols HO(CH[$CH_3$]$CH_2CH_2O$)$_n$—H, where n is an integer and n is ≥4, preferably n is an integer from the range from 4 to 40, particularly preferably from 4 to 20, or polytetramethylene glycols, poly-1,3-propanediols or polycaprolactones with a molecular weight of up to 5000 g/mol, preferably with a molecular weight up to 2000 g/mol.

In a preferred embodiment, the branched polyesters with sulfonate groups are based on a number of different components A, B, C and D, which is less than or equal to 4, i.e. in step a. 4 or fewer different components A, B, C and D are used. Preferably, the number of different components A, B, C and D is 3. The number of different components A, B, C and D is of course at least 2.

Preferably, for the branched polyesters with sulfonate groups, the amount of component A is greater than 20 mol %, preferably greater than 30 mol %, particularly preferably greater than 50 mol %, based on the total amount of carboxylic acids of components A and C together.

A further embodiment of the invention is given by mixtures of the branched polyesters with sulfonate groups according to the invention. Besides the branched polyesters of the invention, such mixtures comprise further constituents such as solvents or surfactants. These mixtures are preferably detergent and cleaner formulations.

The detergent and cleaner formulations in which the branched polyesters with sulfonate groups according to the invention can be used are in powder form, granule form, tablet form, paste form, gel form or liquid. Examples thereof are heavy-duty detergents, mild-action detergents, color detergents, wool detergents, net curtain detergents, modular detergents, washing tablets, bar soaps, stain salts, laundry starches and stiffeners, ironing aids. They comprise at least 0.1% by weight, preferably between 0.1 and 10% by weight and particularly preferably 0.2 to 3% by weight, of the branched polyesters with sulfonate groups according to the invention. The formulations are to be adapted according to their intended use in terms of their composition to the type of textiles to be washed or the surfaces to be cleaned. They comprise conventional detergent and cleaner ingredients, as correspond to the prior art. Representative examples of such detergent and cleaner ingredients are described below.

The total concentration of surfactants in the finished detergent and cleaner formulation can be from 0.1 to 99% by weight, preferably from 5 to 80% by weight, particularly preferably from 10 to 50% by weight. The surfactants used may be anionic, nonionic, amphoteric or cationic. It is also possible to use mixtures of the specified surfactants. Preferred detergent and cleaner formulations comprise anionic and/or nonionic surfactants and mixtures thereof with further surfactants.

Corresponding surfactants are known from the prior art and are described, for example, in EP 1 035 194 A2 (sections [0021] to [0047]).

These mixtures are preferably textile auxiliaries, detergents and cleaners for textiles, additives for detergents and cleaners of textiles, washing auxiliaries, laundry after-treatment compositions or cleaners, rinses or detergents for hard surfaces. The branched polyesters of the invention can be incorporated directly into the formulations (mixtures) in their various presentation forms by methods known to the person skilled in the art. In this connection, mention is to be made of solid formulations such as powders, granules, tablets, pastes, gels and liquid formulations.

The invention therefore further provides the use of the branched polyesters with sulfonate groups according to the invention, or mixtures thereof as soil release polymers, preferably as textile auxiliaries, detergents and cleaners for textiles, additives for detergents and cleaners of textiles, washing auxiliaries, laundry after-treatment compositions or cleaners, rinses or detergents for hard surfaces. The branched polyesters with sulfonate groups are used here as so-called "soil release" polymers or "soil repellants", and impart soil-repelling properties to the treated surfaces. In particular, the branched polyesters with sulfonate groups according to the invention lead to the increase in the cleaning power of detergents and cleaners toward oily and greasy soilings.

The invention further provides the use of the branched polyesters with sulfonate groups according to the invention, or mixtures thereof, as graying inhibitors, preferably for textile fabrics (textiles). The branched polyesters with sulfonate groups are used here as so-called "anti graying" polymers, and ensure that the dirt detached from the fiber remains suspended in the wash liquor and does not become attached again to the textile fabric. In particular, the branched polyesters with sulfonate groups according to the invention lead to a graying inhibition in the case of textile fabrics comprising polyester. In particular, the branched polyesters with sulfonate groups according to the invention are suitable as graying inhibitors for liquid detergents.

The invention further provides the use of the branched polyesters with sulfonate groups according to the invention in aqueous solutions or preparations for achieving a soil release finish on textiles.

A preferred embodiment of the mixtures according to the invention is given by a cleaning formulation comprising, as components:
a) from 0.1 to 20% by weight of at least one polymer according to the invention
b) from 5 to 80% by weight of surfactants
c) from 0.1 to 50% by weight of builders
d) from 0-30% by weight of bleaching system
e) 0-20% by weight of nonaqueous solvents
f) further auxiliaries, such as alkali carriers, antifoams, enzymes (e.g. lipases, proteases, amylases, cellulases), antifoams, dyes, fragrances, further additional graying inhibitors, color transfer inhibitors, thickeners, solubility promoters and water.

The sum of the components from a) to f) gives 100% by weight.

The quantitative ratios of the individual components are adjusted by the person skilled in the art depending on the particular field of use of the cleaning formulation.

The nonionic surfactants used are preferably alkoxylated, advantageously ethoxylated, in particular primary alcohols having preferably 8 to 18 carbon atoms and, on average, 1 to 12 mol of ethylene oxide (EO) per mole of alcohol, in which the alcohol radical can be linear or preferably 2-methyl-branched and/or can comprise linear and methyl-branched radicals in a mixture, as are customarily present in oxo alcohol radicals. In particular, however, preference is given to alcohol ethoxylates with linear or branched radicals from alcohols of native or petrochemical origin having 12 to 18 carbon atoms, for example from coconut alcohol, palm alcohol, tallow fat alcohol or oleyl alcohol, and, on average, 2 to 8 EO per mole of alcohol. The preferred ethoxylated alcohols include, for example, $C_{12}$-$C_{14}$-alcohols with 3 EO, 5 EO, 7 EO or 9 EO, $C_9$-$C_{11}$-alcohol with 7 EO, $C_{13}$-$C_{15}$-alcohols with 3 EO, 5 EO, 7 EO or 9 EO, $C_{12}$-$C_{18}$-alcohols with 3 EO, 5 EO, 7 EO or 9 EO and mixtures of these, such as mixtures of $C_{12}$-$C_{14}$-alcohol with 3 EO and $C_{12}$-$C_{18}$-alcohol with 7 EO, 2 propylheptanol with 3 to 9 EO. Mixtures of short-chain alcohol ethoxylates (e.g. 2-propylheptanol×7 EO) and long-chain alcohol ethoxylates (e.g. C16, 18×7 EO). The stated degrees of ethoxylation are statistical average values (number-average, Mn) which can be an integer or a fraction for a specific product. Preferred alcohol ethoxylates have a narrowed homolog distribution (narrow range ethoxylates, NRE). In addition to these nonionic surfactants, fatty alcohols with more than 12 EO can also be used. Examples thereof are tallow fatty alcohol with 14 EO, 25 EO, 30 EO or 40 EO.

Nonionic surfactants which comprise EO and PO groups together in the molecule can also be used. In this connection, it is possible to use block copolymers with EO-PO block units or PO-EO block units, or else EO-PO-EO copolymers or PO-EO-PO copolymers. It is of course also possible to use mixed alkoxylated nonionic surfactants in which EO and PO units are not distributed blockwise, but randomly. Such products are obtainable by the simultaneous action of ethylene oxide and propylene oxide on fatty alcohols.

Moreover, as further nonionic surfactants, it is also possible to use alkyl glycosides of the general formula (1)

in which $R^1$ is a primary straight-chain or methyl-branched, in particular 2-methyl-branched aliphatic radical having 8 to 22, preferably 12 to 18 carbon atoms, and G is a glycoside unit having 5 or 6 carbon atoms, preferably glucose. The degree of oligomerization x, which indicates the distribution of monoglycosides and oligoglycosides, is any desired number between 1 and 10; preferably, x is 1.2 to 1.4.

A further class of preferably used nonionic surfactants, which are used either as the sole nonionic surfactant or in combination with other nonionic surfactants, are alkoxylated, preferably ethoxylated or ethoxylated and propoxylated fatty acid alkyl esters, preferably having 1 to 4 carbon atoms in the alkyl chain, in particular fatty acid methyl esters, as are described, for example, in the Japanese patent application JP 58/217598 or which are preferably prepared by the process described in the international patent application WO-A-90/13533.

Nonionic surfactants of the amine oxide type, for example N-cocoalkyl-N,N-dimethylamine oxide and N-tallow-alkyl-N,N-dihydroxyethylamine oxide, and the fatty acid alkanolamides may also be suitable. The amount (weight) of these nonionic surfactants is preferably not more than that of the ethoxylated fatty alcohols, in particular not more than half of it.

Further suitable surfactants are polyhydroxy fatty acid amides of the formula (2),

in which $R^2C(=O)$ is an aliphatic acyl radical having 6 to 22 carbon atoms, $R^3$ is hydrogen, an alkyl or hydroxyalkyl radical having 1 to 4 carbon atoms and [Z] is a linear or branched polyhydroxyalkyl radical having 3 to 10 carbon atoms and 3 to 10 hydroxyl groups. The polyhydroxy fatty acid amides are known substances which can usually be obtained by reductive amination of a reducing sugar with ammonia, an alkylamine or an alkanolamine and subsequent acylation with a fatty acid, a fatty acid alkyl ester or a fatty acid chloride.

The group of polyhydroxy fatty acid amides also includes compounds of the formula (3)

in which $R^4$ is a linear or branched alkyl or alkenyl radical having 7 to 12 carbon atoms, $R^5$ is a linear, branched or cyclic alkylene radical having 2 to 8 carbon atoms or an arylene radical having 6 to 8 carbon atoms and $R^6$ is a linear, branched or cyclic alkyl radical or an aryl radical or an oxy-alkyl radical having 1 to 8 carbon atoms, where $C_1$-$C_4$-alkyl or phenyl radicals are preferred, and $[Z]^1$ is a linear polyhydroxyalkyl radical whose alkyl chain is substituted with at least two hydroxyl groups, or alkoxylated, preferably ethoxylated or propoxylated, derivatives of this radical. $[Z]^1$ is preferably obtained by reductive amination of a sugar, for example glucose, fructose, maltose, lactose, galactose, mannose or xylose. The N-alkoxy- or N-aryloxy-substituted compounds can then be converted to the desired polyhydroxy fatty acid amides for example as in WO-A-95/07331 by reaction with fatty acid methyl esters in the presence of an alkoxide as catalyst.

The content of non-ionic surfactants in the liquid detergents or cleaners is preferably from 5 to 40% by weight, preferably from 7 to 30% by weight and in particular from 9 to 25% by weight, in each case based on the total composition.

The anionic surfactants used are, for example, those of the sulfonate and sulfate type. Suitable surfactants of the sulfonate type are preferably $C_9$-$C_{13}$-alkylbenzenesulfonates, olefinsulfonates, i.e. mixtures of alkene- and hydroxyalkanesulfonates, and also disulfonates, as are obtained, for example, from $C_{12}$-$C_{18}$-monoolefins with terminal or internal double bond by sulfonation with gaseous sulfur trioxide and subsequent alkaline or acidic hydrolysis of the sulfonation products. Also suitable are alkanesulfonates which are obtained from $C_{12}$-$C_{18}$-alkanes, for example by sulfochlorination or sulfoxidation with subsequent hydrolysis or neutralization. Likewise, the esters of α-sulfo fatty acids (ester sulfonates), for example the α-sulfonated methyl esters of the hydrogenated coconut, palm kernel or tallow fatty acids, are also suitable.

Further suitable anionic surfactants are sulfated fatty acid glycerol esters. Fatty acid glycerol esters are to be understood as meaning the mono-, di- and triesters, and mixtures thereof, as are obtained in the preparation by esterification of a monoglycerol with 1 to 3 mol of fatty acid or during the transesterification of triglycerides with 0.3 to 2 mol of glycerol. Preferred sulfated fatty acid glycerol esters here are the sulfation products of saturated fatty acids having 6 to 22 carbon atoms, for example of caproic acid, caprylic acid, capric acid, myristic acid, lauric acid, palmitic acid, stearic acid or behenic acid.

The alk(en)yl sulfates are preferably the alkali metal and in particular the sodium salts of the sulfuric acid half-esters of $C_{12}$-$C_{18}$-fatty alcohols, for example of coconut fatty alcohol, tallow fatty alcohol, lauryl alcohol, myristyl alcohol, cetyl alcohol or stearyl alcohol or of the $C_{10}$-$C_{20}$-oxo alcohols and those half-esters of secondary alcohols of these chain lengths. Furthermore, preference is given to alk(en)yl sulfates of the specified chain length which comprise a synthetic, petrochemical-based straight-chain alkyl radical which have an analogous degradation behavior to the equivalent compounds based on fatty chemical raw materials. From a washing point of view, the $C_{12}$-$C_{16}$-alkyl sulfates and $C_{12}$-$C_{15}$-alkyl sulfates and also $C_{14}$-$C_{15}$-alkyl sulfates are preferred. 2,3-Alkyl sulfates, which are prepared, for example, in accordance with the U.S. Pat. No. 3,234,258 or 5,075,041 and can be obtained as commercial products from the Shell Oil Company under the name DAN®, are also suitable anionic surfactants.

The sulfuric acid monoesters of the straight-chain or branched $C_7$-$C_{21}$-alcohols ethoxylated with 1 to 6 mol of ethylene oxide, such as 2-methyl-branched $C_9$-$C_{11}$-alcohols with on average 3.5 mol of ethylene oxide (EO) or $C_{12}$-$C_{18}$-fatty alcohols with 1 to 4 EO, are also suitable. On account of their high foaming behavior, they are used in cleaners only in relatively small amounts, for example in amounts from 1 to 5% by weight.

Further suitable anionic surfactants are also the salts of alkylsulfosuccinic acid, which are also referred to as sulfosuccinates or as sulfosuccinic acid esters and which constitute monoesters and/or diesters of sulfosuccinic acid with alcohols, preferably fatty alcohols and in particular ethoxylated fatty alcohols. Preferred sulfosuccinates comprise $C_8$-$C_{18}$-fatty alcohol radicals or mixtures thereof. Particularly preferred sulfosuccinates comprise a fatty alcohol radical derived from ethoxylated fatty alcohols. In this connection, particular preference is in turn given to sulfosuccinates whose fatty alcohol radicals are derived from ethoxylated fatty alcohols with a narrow homolog distribution. It is likewise also possible to use alk(en)ylsuccinic acid having preferably 8 to 18 carbon atoms in the alk(en)yl chain or salts thereof.

Particularly preferred anionic surfactants are soaps. Saturated and unsaturated fatty acid soaps, such as the salts of lauric acid, myristic acid, palmitic acid, stearic acid, (hydrogenated) erucic acid and behenic acid, and also soap mixtures derived in particular from natural fatty acids, for example coconut, palm kernel, olive oil or tallow fatty acids, are suitable.

The anionic surfactants including the soaps can be present in the form of their sodium, potassium or ammonium salts, and also as soluble salts of organic bases, such as mono-, di- or triethanolamine. Preferably, the anionic surfactants are present in the form of their sodium or potassium salts, in particular in the form of the sodium salts.

The content of anionic surfactants in preferred liquid detergents or cleaners is 2 to 50% by weight, preferably 4 to 40% by weight and in particular 5 to 35% by weight, in each case based on the total composition. It is particularly preferred that the amount of fatty acid soap is at least 2% by weight and particularly preferably at least 4% by weight and particularly preferably at least 6% by weight.

In addition to the polymer according to the invention and to the surfactant(s), the liquid detergents or cleaners can comprise further ingredients which further improve the application and/or esthetic properties of the liquid detergent or cleaner. As a rule, in addition to the polymer according to the invention and to surfactant(s), preferred compositions comprise one or more substances from the group of thickeners, builders, bleaches, bleach activators, enzymes, electrolytes, nonaqueous solvents, pH extenders, fragrances, perfume carriers, fluorescent agents, dyes, hydrotopes, foam inhibitors, silicone oils, antiredeposition agents, optical brighteners, further additional graying inhibitors, antishrink agents, anticrease agents, color transfer inhibitors, antimicrobial active ingredients, germicides, fungicides, antioxidants, corrosion inhibitors, antistatics, ironing aids, phobicization and impregnation agents, swelling and nonslip agents, and also UV absorbers.

Thickeners which can be used are so-called associative thickeners. Examples of thickeners are described in WO 2009/019225 A2, EP-A 0 013 836 or WO 2006/016035.

Builders which may be present in the liquid detergents or cleaners are, in particular, silicates, aluminum silicates (in particular zeolites), carbonates, salts of organic di- and polycarboxylic acids, and mixtures of these substances.

Suitable low molecular weight polycarboxylates as organic builders are, for example:

$C_4$-$C_{20}$-di-, -tri- and -tetracarboxylic acids, such as, for example, succinic acid, propanetri-carboxylic acid, butanetetracarboxylic acid, cyclopentanetetracarboxylic acid and alkyl- and alkylenesuccinic acids with $C_2$-$C_{16}$-alkyl or -alkylene radicals; $C_4$-$C_{20}$-hydroxycarboxylic acids, such as, for example, malic acid, tartaric acid, gluconic acid, glutaric acid, citric acid, lactobionic acid and sucrose mono-, -di- and -tricarboxylic acid;

aminopolycarboxylates, such as, for example, nitrilotriacetic acid, methylglycinediacetic acid, alaninediacetic acid, ethylenediaminetetraacetic acid and serinediacetic acid, N,N-bis-(carboxylatomethyl)-L-glutamate (GLDA);

salts of phosphonic acids, such as, for example, hydroxyethanediphosphonic acid, ethylene-diamine tetra(methylenephosphonate) and diethylenetriamine penta(methylenephosphate).

Suitable oligomeric or polymeric polycarboxylates as organic builders are, for example:

oligomaleic acids, as are described, for example, in EP-A 0 451 508 and EP-A 0 396 303;

co- and terpolymers of unsaturated $C_4$-$C_8$-dicarboxylic acids, where monoethylenically unsaturated monomers
from group (i) in amounts of up to 95% by weight
from group (ii) in amounts of up to 60% by weight
from group (iii) in amounts of up to 20% by weight
may be present in copolymerized form as comonomers.

Suitable unsaturated $C_4$-$C_8$-dicarboxylic acids here are, for example, maleic acid, fumaric acid, itaconic acid and citraconic acid (methylmaleic acid). Preference is given to maleic acid.

Group (i) comprises monoethylenically unsaturated $C_3$-$C_8$-monocarboxylic acids, such as, for example, acrylic acid, methacrylic acid, crotonic acid and vinylacetic acid. From group (i), preference is given to using acrylic acid and methacrylic acid.

Group (ii) comprises monoethylenically unsaturated $C_2$-$C_{22}$-olefins, vinyl alkyl ethers with $C_1$-$C_8$-alkyl groups, styrene, vinyl esters of $C_1$-$C_8$-carboxylic acid, (meth)acrylamide and vinyl-pyrrolidone. From group (ii), preference is given to using $C_2$-$C_6$-olefins, vinyl alkyl ethers with $C_1$-$C_4$-alkyl groups, vinyl acetate and vinyl propionate.

Group (iii) comprises (meth)acrylic esters of $C_1$-$C_8$-alcohols, (meth)acrylonitrile, (meth)acrylamides, (meth)acrylamides of $C_1$-$C_8$-amines, N-vinylformamide and vinylimidazole.

If the polymers of group (ii) comprise vinyl esters in copolymerized form, these may also be present in partially or completely hydrolyzed form to give vinyl alcohol structural units. Suitable co- and terpolymers are known, for example, from U.S. Pat. No. 3,887,806 and SE-A 43 13 909.

Copolymers of dicarboxylic acids suitable as organic builders are preferably:

copolymers of maleic acid and acrylic acid in the weight ratio 10:90 to 95:5, particularly preferably those in the weight ratio 30:70 to 90:10 with molar masses of from 10 000 to 150 000;

terpolymers of maleic acid, acrylic acid and a vinyl ester of a $C_1$-$C_3$-carboxylic acid in the weight ratio 10(maleic acid):90 (acrylic acid+vinyl ester) to 95(maleic acid):10(acrylic acid+vinyl ester), where the weight ratio of acrylic acid to vinyl ester can vary in the range from 20:80 to 80:20, and particularly preferably terpolymers of maleic acid, acrylic acid and vinyl acetate or vinylpropionate in the weight ratio 20(maleic acid):80 (acrylic acid+vinyl ester) to 90(maleic acid):10(acrylic acid+vinyl ester), where the weight ratio of acrylic acid to the vinyl ester can vary in the range from 30:70 to 70:30;

copolymers of maleic acid with $C_2$-$C_8$-olefins in the molar ratio 40:60 to 80:20, where copolymers of maleic acid with ethylene, propylene or isobutane in the molar ratio 50:50 are particularly preferred.

Graft polymers of unsaturated carboxylic acids on low molecular weight carbohydrates or hydrogenated carbohydrates, cf. U.S. Pat. No. 5,227,446, DE-A 44 15 623, DE-A 43 13 909, are likewise suitable as organic builders.

Suitable unsaturated carboxylic acids here are, for example, maleic acid, fumaric acid, itaconic acid, citraconic acid, acrylic acid, methacrylic acid, crotonic acid and vinylacetic acid, and also mixtures of acrylic acid and maleic acid which are grafted on in amounts of from 40 to 95% by weight, based on the component to be grafted.

For the modification, additionally up to 30% by weight, based on the component to be grafted, of further monoethylenically unsaturated monomers may be present in copolymerized form. Suitable modifying monomers are the abovementioned monomers in groups (ii) and (iii).

Suitable graft bases are degraded polysaccharides, such as, for example, acidically or enzymatically degraded starches, insulins or cellulose, reduced (hydrogenated or reductively aminated) degraded polysaccharides, such as, for example, mannitol, sorbitol, aminosorbitol and glucamine, and also polyalkylene glycols with molar masses up to Mw=5000 g/mol (weight average), such as, for example, polyethylene glycols, ethylene oxide/propylene oxide or ethylene oxide/butylene oxide block copolymers, random ethylene oxide/propylene oxide or ethylene oxide/butylene oxide copolymers, alkoxylated mono- or polybasic $C_1$-$C_{22}$-alcohols, cf. U.S. Pat. No. 4,746,456.

From this group, preference is given to using grafted degraded or degraded reduced starches and grafted polyethylene oxides, where 20 to 80% by weight of monomers, based on the graft component, are used in the graft polymerization. For the grafting, preference is given to using a mixture of maleic acid and acrylic acid in the weight ratio of from 90:10 to 10:90.

Polyglyoxylic acids as organic builders are described, for example, in EP-B 0 001 004, U.S. Pat. No. 5,399,286, DE-A 41 06 355 and EP-A 0 656 914. The end groups of the polyglyoxylic acids can have different structures.

Polyamidocarboxylic acids and modified polyamidocarboxylic acids as organic builders are known, for example, from EP-A 0 454 126, EP-B 0 511 037, WO-A 94/01486 and EP-A 0 581 452.

Preferably, the organic builders used are also polyaspartic acid or cocondensates of aspartic acid with further amino acids, $C_4$-$C_{25}$-mono- or -dicarboxylic acids and/or $C_4$-$C_{25}$-mono- or -diamines. Particular preference is given to using polyaspartic acids modified with $C_6$-$C_{22}$-mono- or -dicarboxylic acids or with $C_6$-$C_{22}$-mono- or -diamines and prepared in phosphorus-containing acids.

Condensation products of citric acid with hydroxycarboxylic acids or polyhydroxy compounds as organic builders are known, for example, from WO-A 93/22362 and WO-A 92/16493. Carboxyl-group-comprising condensates of this type usually have molar masses $M_w$ up to 10 000, preferably up to 5000.

Among the compounds which produce $H_2O_2$ in water and can serve as bleaches, sodium perborate tetrahydrate and sodium perborate monohydrate have particular importance. Further bleaches that can be used are, for example, sodium percarbonate, peroxypyrophosphates, citrate perhydrates, and peracidic salts or peracids that produce $H_2O_2$, such as perbenzoates, peroxophthalates, diperazelaic acid, phthaloiminoperacid or diperdodecanedioic acid.

In order to achieve an improved bleaching effect during washing at temperatures of 60° C. and below, bleach activators can be incorporated into the detergents or cleaners. Bleach activators which can be used are compounds which, under perhydrolysis conditions, produce aliphatic peroxocarboxylic acids having preferably 1 to 10 carbon atoms, in particular 2 to 4 carbon atoms, and/or optionally substituted perbenzoic acid. Substances which carry O- and/or N-acyl groups of the specified number of carbon atoms and/or optionally substituted benzoyl groups are suitable. Preference is given to polyacylated alkylenediamines, in particular tetraacetyl-ethylenediamine (TAED), acylated triazine derivatives, in particular 1,5-diacetyl-2,4-dioxo-hexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl or isononanoyl oxybenzenesulfonate (n- or iso-NOBS), carboxylic acid anhydrides, in particular phthalic anhydride, acylated polyhydric alcohols, in particular triacetin, ethylene glycol diacetate and 2,5-diacetoxy-2,5-dihydrofuran.

In addition to the conventional bleach activators, or instead of them, it is also possible to incorporate so-called bleach catalysts into the liquid detergents or cleaners. These substances are bleach-boosting transition metal salts or transition metal complexes, such as, for example, Mn-, Fe-, Co-, Ru- or Mo-salene complexes or -carbonyl complexes. It is also possible to use Mn, Fe, Co, Ru, Mo, Ti, V and Cu complexes with nitrogen-containing tripod ligands, and also Co-, Fe-, Cu- and Ru-amine complexes as bleach catalysts.

Suitable enzymes are in particular those from the classes of the hydrolases, such as the proteases, esterases, lipases or lipolytic enzymes, amylases, cellulases and other glycosyl hydrolases and mixtures of said enzymes. All of these hydrolases contribute during washing to the removal of stains such as protein-, fat- or starch-containing stains and graying. Cellulases and other glycosyl hydrolases can moreover contribute to the color retention and to increasing the softness of the textile by removing pilling and microfibrils. Oxyreductases can also be used for the bleaching or for the inhibition of color transfer. Enzymatic active ingredients obtained from bacterial strains or fungi such as *Bacillus subtilis, Bacillus licheniformis, Streptomyceus griseus* and *Humicola insolens* are particularly well suited. Preference is given to using proteases of the subtilisin type and in particular proteases which are obtained from *Bacillus lentus*. Here, enzyme mixtures, for example of protease and amylase or protease and lipase or lipolytic enzymes or protease and cellulase or of cellulase and lipase or lipolytic enzymes or of protease, amylase and lipase or lipolytic enzymes or protease, lipase or lipolytic enzymes and cellulase, but in particular protease and/or lipase-containing mixtures or mixtures with lipolytic enzymes are of particular interest. Examples of such lipolytic enzymes are the known cutinases. Peroxidases or oxidases have also proven suitable in some cases. Suitable amylases include, in particular, α-amylases, isoamylases, pullulanases and pectinases. The cellulases used are preferably cellobiohydrolases, endoglucanases and β-glucosidases, which are also called cellobiases, or mixtures of these. Since different types of cellulase differ in their CMCase and avicelase activities, the desired activities can be established through targeted mixtures of the cellulases.

The enzymes can be adsorbed on carriers in order to protect them against premature decomposition. The fraction of the enzymes, enzyme mixtures or enzyme granules can be, for example, about 0.1 to 5% by weight, preferably 0.12 to about 2.5% by weight, based on the total formulation.

A broad number of highly diverse salts can be used as electrolytes from the group of inorganic salts. Preferred cations are the alkali and alkaline earth metals, preferred anions are the halides and sulfates. From the point of view of production, the use of NaCl or $MgCl_2$ in the compositions is preferred. The fraction of electrolytes in the compositions is usually 0.5 to 5% by weight.

Nonaqueous solvents which can be used in the liquid detergents or cleaners originate, for example, from the group of mono- or polyhydric alcohols, alkanolamines or glycol ethers, provided they are miscible with water in the stated concentration range. Preferably, the solvents are selected from ethanol, n- or isopropanol, butanols, glycol, propane- or butanediol, glycerol, diglycol, propyl or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl or -ethyl ether, diisopropylene glycol monomethyl or -ethyl ether, methoxy-, ethoxy- or butoxytriglycol, isobutoxyethoxy-2-propanol, 3-methyl-3-methoxybutanol, propylene glycol t-butyl ether, and mixtures of these solvents. Nonaqueous solvents can be used in the liquid detergents or cleaners in amounts between 0.5 and 20% by weight, but preferably below 12% by weight and in particular below 9% by weight, based on the total formulation.

In order to bring the pH of the liquid detergents or cleaners into the desired range, the use of pH extenders may be appropriate. All known acids or alkalis can be used here, provided their use is not precluded for applications-related or ecological reasons or for reasons of consumer protection. Usually, the amount of these extenders does not exceed 7% by weight of the total formulation.

In order to improve the esthetic impression of the liquid detergents or cleaners, they can be colored with suitable dyes. Preferred dyes, the selection of which presents no difficulties at all to the person skilled in the art, have a high storage stability and insensitivity toward the other ingredients of the compositions and to light, and also no marked substantivity toward textile fibers, in order not to stain these.

Suitable foam inhibitors which can be used in the liquid detergents or cleaners are, for example, soaps, paraffins or silicone oils, which can optionally be applied to carrier materials.

Optical brighteners (so-called whiteners) can be added to the liquid detergents or cleaners in order to eliminate graying and yellowing of the treated textile fabrics. These substances attach to the fibers and bring about a brightening and quasi bleaching effect by converting invisible ultraviolet radiation into visible longer-wave light, where the ultraviolet light absorbed from the sunlight is emitted as pale bluish fluorescence and produces pure white with the yellow shade of grayed and/or yellowed laundry. Suitable compounds originate, for example, from the substance classes of the 4,4'-diamino-2,2'-stilbenedisulfonic acids (flavonic acids), 4,4'-distyrylbiphenylene, methylumbelliferones, coumarins, dihydroquinolinones, 1,3-diarylpyrazolines, naphthalimides, benzoxazole, benzisoxazole and benzimidazole systems, and the pyrene derivatives substituted by heterocycles. The optical brighteners are usually used in amounts between 0.03 and 0.3% by weight, based on the finished composition.

Further additional graying inhibitors have the task of keeping the dirt detached from the fibers suspended in the liquor and thus preventing reattachment of the dirt. Of suitability for this purpose are water-soluble colloids mostly of an organic nature, for example glue, gelatin, salts of ether sulfonic acids of starch or of cellulose or salts of acidic sulfuric acid esters of cellulose or of starch. Water-soluble polyamides comprising acidic groups are also suitable for this purpose. Furthermore, soluble starch preparations and starch products other than those mentioned above can be used, for example degraded starch, aldehyde starches, etc. It is also possible to use polyvinylpyrrolidone. However, preference is given to using cellulose ethers, such as carboxymethylcellulose (Na salt), methylcellulose, hydroxyalkylcellulose and mixed ethers, such as methylhydroxyethylcellulose, methylhydroxypropylcellulose, methylcarboxy-methylcellulose and mixtures thereof in amounts of from 0.1 to 5% by weight, based on the compositions.

Since textile fabrics, in particular made of rayon, viscose rayon, cotton and mixtures thereof can have a tendency to crease because the individual fibers are sensitive to bending, folding, pressing and squeezing at right angles to the fiber direction, the compositions can comprise synthetic anticrease agents. These include, for example, synthetic products based on fatty acids, fatty acid esters, fatty acid amides, fatty alkylol esters, fatty alkylolamides or fatty alcohols, which are mostly reacted with ethylene oxide, or products based on lecithin or modified phosphoric acid esters.

To control microorganisms, the liquid detergents or cleaners can comprise antimicrobial active ingredients. A distinction is made here, depending on the antimicrobial spectrum and action mechanism, between bacteriostats and bactericides, fungistats and fungicides etc. Important substances from these groups are, for example, benzalkonium chlorides, alkylarylsulfonates, halophenols and phenol mercuriacetate.

In order to prevent undesired changes in the liquid detergents or cleaners and/or the treated textile fabrics caused by the effect of oxygen and other oxidative processes, the compositions can comprise antioxidants. This class of compound includes, for example, substituted phenols, hydroquinones, pyrocatechins and aromatic amines, and also organic sulfides, polysulfides, dithiocarbamates, phosphites and phosphonates.

Increased wear comfort can result from the additional use of antistats which are additionally added to the compositions. Antistats increase the surface conductivity and thus permit an improved discharging of charges formed. External antistats are generally substances with at least one hydrophilic molecule ligand and produce a more or less hygroscopic film on the surfaces. These mostly interface-active antistats can be divided into nitrogen-containing antistats (amines, amides, quaternary ammonium compounds), phosphorus-containing antistats (phosphoric acid esters) and sulfur-containing antistats (alkylsulfonates, alkyl sulfates). External antistats are described, for example, in the patent applications FR 1,156, 513, GB 873 214 and GB 839 407. The lauryl (or stearyl) dimethylbenzylammonium chlorides disclosed here are suitable as antistats for textile fabrics and as additive for detergents where a hand-modifying effect is additionally achieved.

To improve the water absorption capacity, the rewettability of the treated textile fabrics and to facilitate ironing of the treated textile fabrics, silicone derivatives, for example, can be used in the liquid detergents or cleaners. These additionally improve the wash-out behavior of the compositions through their foam-inhibiting properties. Preferred silicone derivatives are, for example, polydialkyl- or alkylarylsiloxanes in which the alkyl groups have 1 to 5 carbon atoms and are partially or completely fluorinated. Preferred silicones are polydimethylsiloxanes which can, optionally, be derivatized and then are aminofunctional or quaternized or have Si—OH, Si—H and/or Si—Cl bonds. The viscosities of the preferred silicones at 25° C. are in the range between 100 and 100 000 mPas, it being possible to use the silicones in amounts between 0.2 and 5% by weight, based on the total composition.

Finally, the liquid detergents or cleaners can also comprise UV absorbers which attach to the treated textile fabrics and improve the photostability of the fibers. Compounds which have these desired properties are, for example, the compounds and derivatives of benzophenone with substituents in the 2 and/or 4 position that are effective as a result of nonradiative deactivation. Furthermore, substituted benzotriazoles, acrylates phenyl-substituted in the 3 position (cinnamic acid derivatives), optionally with cyano groups in the 2 position, salicylates, organic Ni complexes, and natural substances such as umbelliferone and the endogenous urocanic acid are also suitable.

In order to avoid the decomposition of certain detergent ingredients catalyzed by heavy metals, it is possible to use substances which complex heavy metals. Suitable heavy metal complexing agents are, for example, the alkali metal salts of ethylenediaminetetraacetic acid (EDTA), of nitrilotriacetic acid (NTA) or methylglycinediacetic acid (MGDA), and also alkali metal salts of anionic polyelectrolytes such as polymaleates and polysulfonates.

A preferred class of complexing agents is the phosphonates, which are present in preferred liquid detergents or cleaners in amounts of from 0.01 to 2.5% by weight, preferably 0.02 to 2% by weight and in particular from 0.03 to 1.5% by weight. These preferred compounds include, in particular, organophosphonates, such as, for example, 1-hydroxyethane-1,1-diphosphonic acid (HEDP), aminotri(methylenephosphonic acid) (ATMP), diethylenetriaminepenta(methylene-phosphonic acid) (DTPMP or DETPMP), and also 2-phosphonobutane-1,2,4-tricarboxylic acid (PBS-AM), which are mostly used in the form of their ammonium or alkali metal salts.

The resulting aqueous liquid detergents or cleaners have no sediment; in a preferred embodiment, they are transparent or at least translucent. Preferably, the aqueous liquid detergents or cleaners have a visible light transmission of at least 30%, preferably 50%, particularly preferably 75%, most preferably 90%. Alternatively, the polymers according to the invention can be incorporated into opaque detergents or cleaners.

Besides these constituents, an aqueous detergent or cleaner can comprise dispersed particles, the diameter of which along their largest spatial expansion is 0.01 to 10 000 μm.

Particles may be microcapsules as well as granules, compounds and scented beads, with microcapsules being preferred.

The term "microcapsules" is understood as meaning aggregates which comprise at least one solid or liquid core which is surrounded by at least one continuous sheath, in particular a sheath made of polymer(s). Usually, these are finely dispersed liquid or solid phases surrounded by film-forming polymers, during the production of which the polymers, following emulsification and coacervation or interfacial polymerization, precipitate on to the material to be enveloped. The microscopically small capsules can be dried like powders. Besides single-core microcapsules, multicore aggregates are also known, also called microspheres, which comprise two or more cores distributed in the continuous coating material. Single-core or multicore microcapsules can additionally be surrounded by an additional second, third etc. sheath. Preference is given to single-core microcapsules with a continuous sheath. The sheath can consist of natural, semisynthetic or synthetic materials. Natural sheath materials are, for example, gum arabic, agar agar, agarose, maltodextrins, alginic acid and its salts, e.g. sodium alginate or calcium alginate, fats and fatty acids, cetyl alcohol, collagen, chitosan, lecithins, gelatin, albumin, shellac, polysaccharides, such as starch or dextran, sucrose and waxes. Semisynthetic coating materials are, inter alia, chemically modified celluloses, in particular cellulose esters and ethers, e.g. cellulose acetate, ethylcellulose, hydroxypropylcellulose, hydroxypropylmethylcellulose and carboxymethylcellulose, and also starch derivatives, in particular starch ethers and esters. Synthetic coating materials are, for example, polymers, such as polyacrylates, polyamides, polyvinyl alcohol or polyvinylpyrrolidone. In the interior of the microcapsules, sensitive, chemically or physically incompatible as well as volatile components (=active ingredients) of the aqueous liquid detergent or cleaner can be enclosed in a storage-stable and transport-stable manner. For example, optical brighteners, surfactants, complexing agents, bleaches, bleach activators, dyes and fragrances, antioxidants, builders, enzymes, enzyme stabilizers, antimicrobial active ingredients, graying inhibitors, antiredeposition agents, pH extenders, electrolytes, foam inhibitors and UV absorbers may be present in the microcapsules.

The microcapsules can also comprise cationic surfactants, vitamins, proteins, preservatives, detergency boosters or pearlizing agents. The fillings of the microcapsules can be solids or liquids in the form of solutions or emulsions or suspensions.

The microcapsules can have any desired form within the scope of manufacture, but are preferably approximately spherical. Their diameter along their largest spatial expansion can be between 0.01 µm (not visually recognizable as capsules) and 10 000 µm depending on the components present in their interior and the application. Preference is given to visible micro-capsules with a diameter in the range from 100 µm to 7000 µm, in particular from 400 µm to 5000 µm. The microcapsules are accessible by known methods, with coacervation and interfacial polymerization being attributed the greatest importance. Microcapsules which can be used are all of the surfactant-stable microcapsules supplied on the market, for example the commercial products (the coating material is given in each case in brackets) Hallcrest Microcapsules (gelatin, gum arabic), Coletica Thalaspheres (maritime collagen), Lipotec Millicapseln (alginic acid, agar agar), Induchem Unispheres (lactose, microcrystalline cellulose, hydroxypropylmethylcellulose); Unicerin C30 (lactose, microcrystalline cellulose, hydroxypropylmethylcellulose), Kobo Glycospheres (modified starch, fatty acid esters, phospholipids), Softspheres (modified agar agar) and Kuhs Probiol Nanospheres (phospholipids).

Alternatively, it is also possible to use particles which do not have a core-sheath structure, but in which the active ingredient is distributed in a matrix of a matrix-forming material. Such particles are also referred to as "speckies".

A preferred matrix-forming material is alginate. To produce alginate-based speckies, an aqueous alginate solution, which also comprises the active ingredient to be enclosed or the active ingredients to be enclosed, is dripped and then hardened in a precipitating bath comprising $Ca^{2+}$ ions or $Al^{3+}$ ions.

Alternatively, instead of alginate, other matrix-forming materials can be used. Examples of matrix-forming materials comprise polyethylene glycol, polyvinylpyrrolidone, polymethacrylate, polylysine, poloxamer, polyvinyl alcohol, polyacrylic acid, polyethylene oxide, polyethoxy-oxazoline, albumin, gelatin, acacia, chitosan, cellulose, dextran, Ficoll®, starch, hydroxyethyl-cellulose, hydroxypropylcellulose, hydroxypropylmethylcellulose, hyaluronic acid, carboxy-methylcellulose, carboxymethylcellulose, deacetylated chitosan, dextran sulfate and derivatives of these materials. The matrix formation takes place for these materials for example via gelling, polyanion-polycation interactions or polyelectrolyte-metal ion interactions. The preparation of particles with these matrix-forming materials is known per se.

The particles can be stably dispersed in the aqueous liquid detergents or cleaners. Stable means that the compositions are stable at room temperature and at 40° C. over a period of at least 4 weeks and preferably of at least 6 weeks without the composition creaming up or sedimenting. The polymers according to the invention bring about, through the increase in viscosity, a kinetic slowing of the sedimentation of the particles and thus their stabilization in the suspended state.

The release of the active ingredients from the microcapsules or speckies usually takes place during the application of the compositions comprising them through decomposition of the sheath or the matrix as a result of mechanical, thermal, chemical or enzymatic action.

The branched polyesters with sulfonate groups according to the invention, which are used in aqueous textile wash liquors in concentrations between about 1 to about 180 ppm, preferably in concentrations between about 30 to about 90 ppm, bring about an effective cleaning and soil release treatment and inhibition of the graying especially for polyester, polyester/cotton blends and other synthetic fabrics.

The textile wash liquors are preferably alkaline with a pH range between about 7 to 10 about 11, in particular between about 7.5 to about 10.5, where typical detergent ingredients are present. Surprisingly, especially insofar as the pH and anionic surface-active compounds are concerned, the detersive agents usually present in detergents and cleaners are also used in the cleaners according to the invention in the amounts as corresponds to the prior art. They thereby fulfill their desired purpose, i.e. for example the cleaning or bleaching of fabric, without having a disadvantageous effect on the soil release properties of the polyesters with sulfonate groups according to the invention. The polyesters with sulfonate groups according to the invention can also be used for achieving a soil release finish in standard commercial fabric softeners for household use. These comprise essentially softening components, co-softeners, emulsifiers, perfumes, dyes and electrolytes, and are adjusted to an acidic pH of less than 7, preferably between 3 and 5.

The invention further provides a method for producing branched polyesters with sulfonate groups, comprising
1. the reaction of the components A, B, optionally C and optionally D to give branched polyesters, where
   i. the component A is selected from the group of α,β-olefinically unsaturated dicarboxylic acids ($A_2$), and
   ii. the component B is selected from the group of tri- or higher-functional alcohols (By),
   iii. the optional component C is selected from the group of difunctional alcohols ($B_2$) or the difunctional carboxylic acids ($C_2$) without α,β-olefinically unsaturated bonds,
   iv. the optional component D is selected from fatty acids or fatty alcohols,
2. and the subsequent reaction of the branched polyesters obtained in step a. with hydrogen sulfite, where the molar amount of hydrogen sulfite is at most 95 mol %, based on the amount of α,β-olefinically unsaturated dicarboxylic acid ($A_2$).

Step 1. of the method according to the invention can be carried out without dilution or in the presence of a solvent. Suitable solvents are, for example, hydrocarbons such as paraffins or aromatics. Particularly suitable paraffins are n-heptane and cyclohexane. Particularly suitable aromatics are toluene, ortho-xylene, meta-xylene, para-xylene, xylene as isomer mixture, ethylbenzene, chlorobenzene and ortho- and meta-dichlorobenzene. Also suitable as solvents in the absence of acidic catalysts are very particularly ethers, such as, for example, dioxane or tetrahydrofuran, and ketones such as, for example, methyl ethyl ketone and methyl isobutyl ketone.

According to the invention, the amount of added solvent is at least 0.1% by weight, based on the mass of the used starting materials to be reacted, preferably at least 1% by weight and particularly preferably at least 10% by weight. It is also possible to use excesses of solvent, based on the mass of used starting materials to be reacted, for example 1.01 to 10-fold. Solvent amounts of more than 100-fold, based on the mass of used starting materials to be reacted are not advantageous because at considerably lower concentrations of the reactants, the reaction rate diminishes considerably, which leads to uneconomically long reaction times.

In one preferred embodiment, the reaction is carried out free from solvents.

To carry out step 1. in the method according to the invention, it is possible to work in the presence of a water-withdrawing agent as additive, which is added at the start of the reaction. Molecular sieves, in particular molecular sieve 4 Å, $MgSO_4$ and $Na_2SO_4$, for example, are suitable. During the reaction, further water-withdrawing agent can also be added, or water-withdrawing agent can be replaced with fresh water-withdrawing agent. Water and/or alcohol formed during the reaction can also be distilled off, and, for example, it is possible to use a water separator in which the water is removed with the help of an entrainer.

Step 1. of the method according to the invention can be carried out in the absence of catalysts. However, preference is given to working in the presence of at least one catalyst. These are preferably acidic inorganic, organometallic or organic catalysts or mixtures of two or more acidic inorganic, organometallic or organic catalysts.

Within the context of this specification, acidic catalysts are also considered to be Lewis acids, i.e. those compounds according to Römpps Chemie-Lexikon, key word "Acid-base concept", which are able to accept an electron pair into the valence shell of one of their atoms.

For the purposes of the present invention, acidic inorganic catalysts are, for example, sulfuric acid, sulfates and hydrogen sulfates, such as sodium hydrogen sulfate, phosphoric acid, phosphonic acid, hypophosphorous acid, aluminum sulfate hydrate, alum, acidic silica gel (pH≤6, in particular ≤5) and acidic aluminum oxide. It is also possible to use, for example, aluminum compounds of the general formula $Al(OR^1)_3$ and titanates of the general formula $Ti(OR^1)_4$ as acidic inorganic catalysts, where the radicals $R^1$ can in each case be identical or different and are selected independently of one another from $C_1$-$C_{20}$-alkyl radicals, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl.

$C_3$-$C_{12}$-Cycloalkyl radicals, for example cyclopropyl, cyclobutyl, cyclopentyl, cyclohexyl, cycloheptyl, cyclooctyl, cyclononyl, cyclodecyl, cycloundecyl and cyclododecyl; preference being given to cyclopentyl, cyclohexyl and cycloheptyl.

Preferably, the radicals $R^1$ in $Al(OR^1)_3$ and $Ti(OR^1)_4$ are in each case identical and selected from n-butyl, isopropyl, 2-ethylhexyl, n-octyl, decyl or dodecyl.

Preferred acidic organometallic catalysts are selected, for example, from dialkyltin oxides $R^1{}_2SnO$ or dialkyltin diesters $R^1{}_2Sn(OR^2)_2$, where $R^1$ is as defined above and can be identical or different.

$R^2$ can have the same meanings as $R^1$ and can additionally be $C_6$-$C_{12}$-aryl, for example phenyl, o-, m- or p-tolyl, xylyl or naphthyl. $R^2$ can in each case be identical or different.

Examples of organotin catalysts are tin(II) n-octanoate, tin(II) 2-ethylhexanoate, tin(II) laurate, dibutyltin oxide, diphenyltin oxide, dibutyltin dichloride, dibutyltin diacetate, dibutyltin dilaurate, tibutyltin dimaleate or dioctyltin diacetate. Also conceivable are organoantimony, organobismuth or organoaluminum catalysts.

Particularly preferred representatives of acidic organometallic catalysts are dibutyltin oxide, diphenyltin oxide and dibutyltin dilaurate.

Preferred acidic organic catalysts are acidic organic compounds with, for example, phosphate groups, sulfonic acid groups, sulfate groups or phosphonic acid groups. Particular preference is given to sulfonic acids such as, for example, para-toluenesulfonic acid. It is also possible to use acidic ion exchangers as acidic organic catalysts, for example polystyrene resins which contain sulfonic acid groups and are crosslinked with about 2 mol % of divinylbenzene.

It is also possible to use combinations of two or more of the aforementioned catalysts. It is possible as well to use those organic or organometallic or else inorganic catalysts which are present in the form of discrete molecules, in immobilized form, for example on silica gel or on zeolites.

If it is desired to use acidic inorganic, organometallic or organic catalysts, then the amount used is preferably 1 to 10 000 ppm of catalyst, particularly preferably 2 to 5000 ppm, based on the total mass of the hydroxy- and the carboxy-containing compounds.

If it is desired to use acidic inorganic, organometallic or organic catalysts, then the method is carried out in accordance with the invention at temperatures from 60 to 140° C. Preference is given to working at temperatures of from 80 to 140° C., particularly preferably at 100 to 130° C.

According to the invention, it is also possible to use enzymes as catalysts, although their use is less preferred.

Enzymes which can be used for this purpose are selected, for example, from hydrolases (E.C. 3.-.-.-), and among these particularly from the esterases (E.C. 3.1.-.-), lipases (E.C. 3.1.1.3), glycosylases (E.C. 3.2.-.-) and proteases (E.C. 3.4.-.-), in free form or in a form immobilized physically or chemically on a support, preferably lipases, esterases or proteases and particularly preferably esterases (E.C. 3.1.-.-). Very particular preference is given to Novozyme 435 (lipase from *Candida antarctica* B) or lipase from *Alcaligenes* sp., *Aspergillus* sp., *Mucor* sp., *Penicilium* sp., *Geotricum* sp., *Rhizopus* sp., *Burkholderia* sp., *Candida* sp., *Pseudomonas* sp., *Thermomyces* sp. or porcine pancreas, particular preference being given to lipase from *Candida antarctica* B or from *Burkholderia* sp. The enzymes listed are commercially available, for example from Novozymes Biotech Inc., Denmark.

The enzyme content in the reaction medium is generally in the range from about 0.1 to 10% by weight, based on the sum of the components used.

If it is desired to use enzymes as catalysts, then step 1. of the method is carried out in accordance with the invention at temperatures of 20 and up to 120° C., preferably 20 to 100° C. and particularly preferably 20 to 80° C.

The method according to the invention is preferably carried out under inert-gas atmosphere, i.e. a gas which is inert under the reaction conditions, for example under carbon dioxide, combustion gases, nitrogen or noble gas, among which argon in particular is to be mentioned.

The pressure conditions of the method according to the invention are generally not critical. It is possible to work at significantly reduced pressure, for example at 10 to 500 mbar. The method according to the invention can also be carried out at pressures above 500 mbar. For reasons of simplicity, it is preferred to carry out the reaction at atmospheric pressure; however, it is also possible to carry it out at a slightly elevated pressure, for example up to 1200 mbar. It is also possible to work under significantly increased pressure, for example at pressures up to 10 bar. Preference is given to carrying out the reaction at reduced pressure or atmospheric pressure, particularly preferably at atmospheric pressure.

The reaction time of the method according to the invention is usually 10 minutes to 48 hours, preferably 30 minutes to 24 hours and particularly preferably 1 to 12 hours.

When the reaction in step 1. is complete, the highly functional branched polyesters can be isolated easily, for example by filtering off the catalyst and optionally stripping off the solvent, the stripping-off of the solvent usually being carried out at reduced pressure. Further highly suitable work-up methods are precipitation of the polymer following the addition of water and subsequent washing and drying.

If required, the reaction mixture can be subjected to a decoloration, for example by treatment with activated carbon or metal oxides, such as e.g. aluminum oxide, silicon oxide, magnesium oxide, zirconium oxide, boron oxide or mixtures thereof, in amounts of, for example, 0.1 to 50% by weight, preferably 0.5 to 25% by weight, particularly preferably 1 to 10% by weight, at temperatures of, for example, 10 to 140° C., preferably 20 to 130° C. and particularly preferably 30 to 120° C.

This can take place by adding the pulverulent or granular decoloring agent to the reaction mixture and subsequent filtration, or by passing the reaction mixture over a bed of a decoloring agent in the form of any desired suitable moldings.

The decoloration of the reaction mixture can take place at any desired point in the work-up process, for example at the stage of the crude reaction mixture or following optionally carried out prewashing, neutralization, washing or solvent removal.

The reaction mixture can also be subjected to a prewashing and/or a neutralization and/or a post-washing, preferably only to a neutralization. Optionally, the order of neutralization and prewashing can also be swapped.

From the aqueous phase of the washing and/or neutralization it is possible to recover, at least partially, any valuable products present by acidification and extraction with a solvent, and to use them afresh.

In terms of processing, all extraction and washing processes and apparatuses known per se can be used for a washing or neutralization in the method according to the invention, e.g. those which are described in Ullmann's Encyclopedia of Industrial Chemistry, 6th ed., 1999 Electronic Release, Chapter: Liquid—Liquid Extraction—Apparatus. For example, these may be single-stage or multi-stage, preferably single-stage, extractions, and also those in cocurrent or countercurrent operation, preferably countercurrent operation.

However, in a preferred embodiment, it is possible to dispense with a washing, neutralization and decoloring.

Step 2. of the method according to the invention for the sulfonation of the polyester can be carried out without dilution or in the presence of a solvent. Suitable solvents are, for example, water or alcohols.

The amount of added solvent according to the invention is at least 0.1% by weight, based on the mass of the used starting materials to be reacted, preferably at least 1% by weight and particularly preferably at least 10% by weight. It is also possible to use excesses of solvent, based on the mass of used starting materials to be reacted, for example 1.01 to 10-fold. Solvent amounts of more than 100-fold, based on the mass of used starting materials to be reacted, are not advantageous because, at significantly lower concentrations of the reactants, the rate of reaction diminishes considerably, which leads to uneconomically long reaction times.

Step 2. of the method according to the invention is carried out at temperatures from 60 to 150° C. Preference is given to working at temperatures of from 80 to 120° C., particularly preferably at from 90 to 110° C.

Preferably, the polyester is introduced as initial charge as stirable melt at reaction temperature, and is then admixed with an aqueous solution of the sulfonating reagent.

Sulfonating reagents which can be used are solutions of the alkali metal or alkaline earth metal salts of sulfuric acid (hydrogen sulfites). The concentration of the solutions is from 10 to 90% by weight, preferably from 20 to 50% by weight and very particularly preferably from 30 to 45% by weight.

Preference is given to using aqueous solutions of sodium hydrogen sulfite, potassium hydrogen sulfite or magnesium hydrogen sulfite. Very particular preference is given to aqueous solutions of sodium hydrogen sulfite.

Alternatively, it is possible to use an acidic aqueous solution of sodium thiosulfate, which disproportionates into hydrogen sulfite.

The reaction time in step 2. of the method according to the invention is usually 10 minutes to 48 hours, preferably 30 minutes to 24 hours and particularly preferably 1 to 3 hours.

The reaction is complete when hydrogen sulfite can no longer be detected in the reaction mixture. During the conversion, the consumption of the hydrogen sulfite in the reaction mixture can be monitored qualitatively or quantitatively.

Of suitability for the qualitative monitoring is, for example, the treatment of a sample of the reaction mixture with dilute potassium permanganate solution and subsequent addition of barium chloride solution. Any hydrogen sulfite present here is firstly oxidized by permanganate to sulfate, which, upon contact with barium ions, precipitates out as sparingly soluble barium sulfate. It should be taken into consideration that the detection can be disturbed by the reaction of the potassium permanganate with maleic acid double bonds.

Of suitability for the quantitative monitoring of the reaction is an iodometric determination of the sulfite, as described, for example, in Gerhard Schulze, Jürgen Simon "Jander/Jahr Maβanalyse", 17th edition 2009, de Gruyter, Berlin, p. 187.

The present invention makes available branched polyesters with sulfonate groups which can be used advantageously for cleaning purposes of textiles while avoiding redeposition effects. These polymeric effect substances, which have a low toxicity, can be prepared by means of a technically relatively simple and cost-effective method and can be readily incorporated into formulations for cleaning purposes in their various presentation forms.

The invention is illustrated in more detail by the examples, without the examples limiting the subject matter of the invention.

EXAMPLES

MA=maleic anhydride
TMP=trimethylolpropane
TMP×n PO=reaction product of TMP with
  n molar excess of propylene oxide
ASA=octadecenylsuccinic acid
DBTL=dibutyltin dilaurate
Ti(OBu)$_4$=titanium tetrabutylate
x % NaHSO$_3$ means that in the sulfonation reaction precisely the amount of NaHSO$_3$ has been used which is required to sulfonate x % (of the number) of α,β-olefinically unsaturated double bonds theoretically present in the polymer.

The molecular weights of the unsulfonated polyesters were determined by gel permeation chromatography (GPC) (column combination: 2×PLgel 3 μm MIXED-E and 1×ResiPore 3 μM; standard: polymethyl methacrylate (PMMA); eluent: THF).

The acid numbers (mg KOH/g polymer) were determined in accordance with DIN 53402.

Polymer 1: MA: TMP×15.7 PO 98.3 g of MA, 1040.4 g of TMP×15.7 PO and 0.35 g of Ti(OBu)$_4$ were weighed into a 2000 ml round flask equipped with stirrer, internal thermometer, gas inlet tube and descending condenser with capture vessel, and heated to 180° C. with stirring. The reaction mixture was stirred for 14 h at 180° C. while separating off water of reaction until the GPC control showed a weight-average molecular weight of 7300 g/mol. The reaction was then completed by cooling to room temperature.

The product was obtained in the form of a brown water-insoluble resin.

The following characteristic data were determined:
acid number=24 mg KOH/g polymer
M$_n$=1890 g/mol, M$_w$=8390 g/mol Sulfonation of Polymer 1:

In a round flask, equipped with stirrer, internal thermometer, gas inlet tube and reflux condenser, Polymer 1 was admixed with aqueous NaHSO$_3$ solution (39% strength), and the mixture was heated to 100° C. and stirred at this temperature for 5 h. The now homogeneous reaction mixture was then cooled to room temperature and adjusted to a pH of pH=5 using 50% strength potassium hydroxide solution. The reaction mixture was transferred to an aluminum dish and dried by drying in a vacuum drying cabinet (70° C.). Brown wax-like products were obtained.

| Sulfo-nated polymer | Mixture | | | Product | | |
|---|---|---|---|---|---|---|
| | % NaHSO$_3$ based on MA | Amount of Polymer 1 [g] | Amount of NaHSO$_3$ (39% strength in H$_2$O) [g] | AN [mg KOH/g] | Color | Solu-bility in water |
| 1a | 75% | 500.0 | 84.0 | 6 | Brown | Opaque |
| 1b | 50% | 105.5 | 11.7 | 9 | Brown | Opaque |
| 1c | 30% | 150.0 | 10.3 | 8 | Brown | Opaque |

Polymer 2: MA: TMP×15.7 PO 98.5 g of MA, 1051 g of TMP×15.7 PO and 0.35 g of DBTL were weighed into a 2000 ml round flask equipped with stirrer, internal thermometer, gas inlet tube and descending condenser with capture vessel, and heated to 180° C. with stirring. The reaction mixture was stirred for 10 h at 180° C. while separating off water of reaction until the GPC control showed a weight-average molecular weight of 9300 g/mol. The reaction was then completed by cooling to room temperature.

The product was obtained in the form of a yellow water-insoluble resin.

The following characteristic data were determined: acid number=28 mg KOH/g polymer
M$_n$=2980 g/mol, M$_w$=10 400 g/mol Sulfonation of Polymer 2:

In a round flask equipped with stirrer, internal thermometer, gas inlet tube and reflux condenser, Polymer 2 was admixed with aqueous NaHSO$_3$ solution (39% strength), and the mixture was heated to 100° C. and stirred for 5 h at this temperature. The now homogeneous reaction mixture was then cooled to room temperature and adjusted to a pH of pH=5 using 50% strength potassium hydroxide solution. The reaction mixture was transferred to an aluminum dish and dried by drying in a vacuum drying cabinet (70° C.). Brownish wax-like products were obtained.

| Sulfo-nated polymer | Mixture | | | Product | | |
|---|---|---|---|---|---|---|
| | % NaHSO$_3$ based on MA | Amount of Polymer 1 [g] | Amount of NaHSO$_3$ (39% strength in H$_2$O) [g] | AN [mg KOH/g] | Color | Solu-bility in water |
| 2a* | 90% | 500.0 | 113.0 | 2 | Brown-ish | Opaque |
| 2b | 75% | 510.2 | 89.3 | 2 | Brown-ish | Opaque |

*the molecular weight of the sulfonated Polyester 2a was determined by means of gel permeation chromatography (GPC) (standard: PMMA; eluent: 0.08 mol/l TRIS-buffer pH=7.0 in dist water + 0.15 mol/l NaCl + 0.01 mol/l NaN$_3$): M$_n$=5030 g/mol, M$_w$=63 800 g/mol.

Polymer 3: MA: TMP×15.7 PO: ASA 73.6 g of MA, 1042.2 g of TMP×15.7 PO and 87.2 g of ASA were weighed into a 2000 ml round flask equipped with stirrer, internal thermometer, gas inlet tube and descending condenser with capture vessel, and heated to 180° C. with stirring. As a homogeneous melt was produced, 0.36 g of DBTL were added as catalyst, and the reaction mixture was stirred at 160° C. while eliminating water of reaction until the GPC control showed a weight-average molecular weight of 5700 g/mol. The reaction was then completed by cooling to room temperature.

The product was obtained in the form of a brownish water-insoluble resin.

The following characteristic data were determined:
acid number=25 mg KOH/g polymer
M$_n$=1780 g/mol, M$_w$=6310 g/mol Sulfonation of Polymer 3:

In a round flask equipped with stirrer, internal thermometer, gas inlet tube and reflux condenser, Polymer 3 was admixed with aqueous NaHSO$_3$ solution (39% strength), and the mixture was heated to 100° C. and stirred at this temperature for 5 h. The now homogeneous reaction mixture was then cooled to room temperature and adjusted to a pH of pH=5 using 50% strength potassium hydroxide solution. The reaction mixture was transferred to an aluminum dish and dried by drying in a vacuum drying cabinet (70° C.). Orange-colored wax-like products were obtained.

| Sulfonated polymer | % NaHSO₃ based on MA | Amount of Polymer 1 [g] | Amount of NaHSO₃ (39% strength in H₂O) [g] | AN [mg KOH/g] | Color | Solubility in water |
|---|---|---|---|---|---|---|
| 3a | 90% | 150.3 | 22.4 | 16 | Orange | Opaque |
| 3b | 75% | 150.0 | 18.7 | 12 | Orange | Opaque |
| 5a | 90% | 150.0 | 36.2 | 19 | Yellow | Opaque |
| 5b | 75% | 150.0 | 30.0 | 20 | Yellow | Opaque |

Sulfonated Polymer 4: (MA: TMP×5.2 PO: ASA)*75% NaHSO₃

93.1 g of MA, 453.6 g of TMP×5.2 PO, 36.7 g of ASA were weighed into a 1000 ml round flask equipped with stirrer, internal thermometer, gas inlet tube and descending condenser with capture vessel and heated to 160° C. with stirring. As a homogeneous melt was formed, 0.18 g of Ti(n-BuO)₄ was added as catalyst, and the reaction mixture was stirred at 160° C. while separating off water of reaction until the GPC control showed a weight-average molecular weight of 9600 g/mol. The reaction mixture was then cooled to 105° C. and admixed with 190 g of aqueous NaHSO₃ solution (39% strength). The mixture was then stirred for 5 h at 110° C. before the reaction mixture was cooled to room temperature. The product was transferred to an aluminum dish and dried in a vacuum drying cabinet (70° C.).

The product was obtained in the form of a yellow, water-soluble wax-like solid.

The following characteristic data were determined prior to the sulfonation:

acid number=33 mg KOH/g polymer $M_n$=1860 g/mol, Mw=12 400 g/mol

The following characteristic data were determined:

acid number=7 mg KOH/g polymer

Polymer 5: MA: TMP×15.7 PO: PolyTHF® 250

49.3 g of MA, 419.1 g of TMP×15.7 PO and 31.9 g of PolyTHF® 250 (technical-grade, BASF SE) were weighed into a 1000 ml round flask fitted with stirrer, internal thermometer, gas inlet tube and descending condenser with capture vessel and heated to 180° C. with stirring. As a homogeneous melt was formed, 0.15 g of DBTL was added as catalyst and the reaction mixture was stirred at 180° C. while separating off water of reaction until the GPC control showed a weight-average molecular weight of 9600 g/mol. The reaction was then completed by cooling to room temperature.

The product was obtained in the form of a brownish water-insoluble resin.

The following characteristic data were determined:

acid number=28 mg KOH/g polymer

Mn=1900 g/mol, $M_w$=14 800 g/mol

Sulfonation of Polymer 5:

In a round flask equipped with stirrer, internal thermometer, gas inlet tube and reflux condenser, Polymer 5 was admixed with aqueous NaHSO₃ solution (39% strength), and the mixture was heated to 100° C. and stirred for 5 h at this temperature. The now homogeneous reaction mixture was then cooled to room temperature and adjusted to a pH of pH=5 using 50% strength potassium hydroxide solution. The reaction mixture was transferred to an aluminum dish and dried by drying in a vacuum drying cabinet (70° C.). Yellow wax-like products were obtained.

Application Tests

The specified polymers were added to different liquid detergent formulations in a concentration of 5% by weight (see table 1) and tested as to their secondary detergency. The graying (redeposition) serves as a quality feature for assessing detergents and detergent formulations. This test is used in the development and optimization of detergent formulations or for assessing the performance of detergent components.

The graying test consists of three repeat washes, in which, in each cycle, rinsing is carried out and fresh soiled fabric is used. The white fabrics are in each case reused and evaluated at the end of the experiment.

Washing Conditions

| | |
|---|---|
| Washing device | Launder-O-Meter from Atlas, Chicago, USA |
| Water hardness | 2.5 mmol $Ca^{++}$ + $Mg^{++}$/l = 14° German hardness |
| Ca:Mg:NaHCO₃ ratio | 4:1:8 mol |
| Washing temperature | 40° C. |
| Washing time | 30 min (inc. heating time) |
| Wash cycles | 3 |
| Detergent dosing | 5.0 g/l |
| Liquor ratio | 1:10 |
| Total liquor | 250 ml |
| Soiled fabric | 5 g EMPA 101 cotton fabric with soot/olive oil soiling |
| | 5 g SBL 2004 (soiled ballast fabric, wfk) |
| White fabric | Polyester wfK30A and EMPA 407 |
| | Polyamide EMPA 225 and EMPA 406 |
| Ballast fabric | cotton, blended fabric |

Test fabrics are available, for example, from Wfk-Testgewebe GmbH, Christenfeld 10, D-41379 Brueggen and from EMPA Testmaterialien AGm Möverstrasse 12, CH-9015 St. Gallen.

After rinsing, spinning is carried out and the fabric is hung up separately to dry.

To determine the secondary detergency, the reflectance of the white fabric is measured before and after washing using a photometer ((Elrepho) from Datacolor AG, CH-8305 Dietikon, Switzerland).

The reflectance values are determined at 460 nm, with in each case 4 measurement points being averaged per fabric type. For comparison, test fabric without the addition of polymer was washed. delta R (reflectance of the white fabric washed with polymer addition minus reflectance of the white fabric washed with the liquid detergent without polymer) is evaluated, see table 2.

TABLE 1

| | Formulation 1 20% strength | Formulation 2 20% strength |
|---|---|---|
| LAS | 10.1 | 7.7 |
| Coconut fatty acid C12-18 | 2.5 | 2.4 |
| KOH | 3.4 | 2.7 |

TABLE 1-continued

|  | Formulation 1 20% strength | Formulation 2 20% strength |
|---|---|---|
| Lutensol AO 7 | 5.7 | 8.6 |
| 1,2-Propylene glycol | 6 | 6 |
| Ethanol | 2 | 2 |
| Water | ad 90 | ad 90 |

Preparation of the Formulations:

LAS, fatty acid, propylene glycol and water are introduced as initial charge, heated to 40° C. and neutralized with KOH (as 50% strength solution). After cooling, Lutensol AO 7 and ethanol are added.

TABLE 2

Washing results in formulations 1 and 2 on PES and PA fabric

| | Formulation 1 | | Formulation 2 | | Formulation 1 | | Formulation 2 | |
|---|---|---|---|---|---|---|---|---|
| | Polyester fabric | | | | Polyamide fabric | | | |
| Polymer | wfk 30 A delta R | EMPA 407 delta R | wfk 30 A delta R | EMPA 407 delta R | EMPA 225 delta R | EMPA 406 delta R | EMPA 225 delta R | EMPA 406 delta R |
| 1a | 7 | 11 | 7 | 8 | 3 | 2 | 2 | 4 |
| 1b | 2 | 7 | 3 | 7 | 2 | 2 | 1 | 2 |
| 1c | 8 | 14 | 6 | 9 | 5 | 4 | 2 | 2 |
| 3a | 6 | 8 | 6 | 9 | 4 | 4 | 2 | 2 |
| 3b | 4 | 9 | 5 | 8 | 2 | 3 | 1 | 3 |
| 5a | 6 | 9 | 6 | 9 | 3 | 3 | 0 | 2 |
| 5b | 6 | 9 | 6 | 9 | 2 | 2 | 0 | 2 |
| 4 | 3 | 5 | 6 | 4 | 1 | −2 | 2 | 3 |
| 2b | 6 | 7 | 8 | 5 | 5 | 3 | 4 | 5 |
| 2a | 6 | 6 | 8 | 4 | 3 | 4 | 3 | 4 |

Example Relating to Formulation Stabilities

The specified polymers were added in a concentration of 5% by weight to the liquid detergent formulations from table 1 and stored for 2 weeks at 40° C.

No clouding or sediment were evident. Testing the stored samples in a washing experiment against a freshly prepared formulation did not give rise to any differences in the washing performance.

Texcare SRA-300 F (manufacturer: Clariant GmbH), which can be used as graying inhibitor for polyester, could not be stably incorporated under the same conditions into the specified liquid detergent formulations; it led to clouding and sediment upon storage.

The invention claimed is:

1. A detergent or cleaner for textiles comprising:
   0.1 to 99% by weight of at least one surfactant selected from the group consisting of an anionic surfactant, a nonionic surfactant, an amphoteric surfactant and a cationic surfactant; and
   a mixture comprising the branched polyester with sulfonate groups obtained by a process comprising:
      reacting an $\alpha,\beta$-olefinically unsaturated dicarboxylic acid ($A_2$),
      a tri- or higher-functional alcohol ($B_y$),
      optionally a difunctional alcohol ($B_2$) or difunctional carboxylic acid ($C_2$) without $\alpha,\beta$-olefinically unsaturated bonds, and
      optionally a fatty acid or fatty alcohol, to obtain an intermediate branched polyester; and
   subsequently reacting the intermediate branched polyester with hydrogen sulfite, wherein a molar amount of hydrogen sulfite is at most 95 mol %, based on an amount of the $\alpha,\beta$-olefinically unsaturated dicarboxylic acid ($A_2$).

2. The detergent or cleaner for textiles according to claim 1, wherein a fraction of the tri- or higher-functional alcohol ($B_y$) in the reacting is at least 30 mol %, based on a total amount of the $\alpha,\beta$-olefinically unsaturated dicarboxylic acid ($A_2$), the tri- or higher-functional alcohol ($B_y$), the difunctional alcohol ($B_2$) or the difunctional carboxylic acid ($C_2$) without $\alpha,\beta$-olefinically unsaturated bonds, and the fatty acid or fatty alcohol.

3. The detergent or cleaner for textiles according to claim 1, wherein the $\alpha,\beta$-olefinically unsaturated dicarboxylic acid ($A_2$) is maleic acid, itaconic acid, fumaric acid, citraconic acid, mesaconic acid or glutaconic acid.

4. The detergent or cleaner for textiles according to claim 1, wherein the tri- or higher-functional alcohol ($B_y$) is selected from the group consisting of $B_y$, a tri- or higher-functional polyetherol, and a tri- or higher-functional polyesterol,
   wherein
   $B_y$ is
      glycerol, trimethylolethane, trimethylolpropane, bis(trimethylolpropane), 1,2,4-butanetriol, pentaerythritol, diglycerol, triglycerol or higher condensation products of glycerol, di(trimethylolpropane), di(pentaerythritol), sugar, sugar alcohol, in which y is greater than or equal to 3,
   the tri- or higher-functional polyetherol is based on a tri- or higher-functional alcohol, and is obtained by reaction with ethylene oxide, propylene oxide, butylene oxide, or any combination thereof, and
   the tri- or higher-functional polyesterol is based on a tri- or higher-functional alcohol, and is obtained by reaction with caprolactone.

5. The detergent or cleaner for textiles according to claim 1, wherein the difunctional carboxylic acid ($C_2$) without $\alpha,\beta$-olefinically unsaturated bonds is selected from the group consisting of
   aliphatic dicarboxylic acid, and aromatic dicarboxylic acid,
   and the specified dicarboxylic acid can also be substituted.

6. The detergent or cleaner for textiles according to claim 1, wherein the difunctional alcohol ($B_2$) without olefinically unsaturated bonds is selected from the group consisting of $B_2$, polyethylene glycol, polypropylene glycol, polytetramethylene glycol, poly-1,3-propanediol, and polycaprolactone, wherein B$_2$ is ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2-cyclopentanediol, 1,3-cyclopentanediol, 1,2-cyclohexanediol, 1,3-cyclohexanediol, 1,4-cyclohexanediol, 1,1-bis(hydroxymethyl)cyclohexane, 1,2-bis(hydroxymethyl)cyclohexane, 1,3-bis(hydroxymethyl)cyclohexane bis(hydroxymethyl)cyclohexane, 1,1-bis(hydroxyethyl)cyclohexane, 1,2-bis(hydroxyethyl)cyclohexane, 1,3-bis(hydroxyethyl)cyclohexane 1,4-bis(hydroxyethyl)cyclohexane, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, isosorbide, dipropylene glycol, tripropylene glycol, the polyethylene glycol is of formula HO(CH$_2$CH$_2$O)$_n$—H, and the polypropylene glycol is of formula HO(CH[CH$_3$]CH$_2$O)$_n$—H, wherein n is an integer and n is ≥4, the polyethylene polypropylene glycol, has an order of ethylene oxide or propylene oxide units which can be blockwise or random, and the polytetramethylene glycol, poly-1,3-propanediol and polycaprolactone have a molecular weight of up to 5000 g/mol.

7. The detergent or cleaner for textiles according to claim 1, wherein a number of the α,β-olefinically unsaturated dicarboxylic acid (A$_2$), the tri- or higher-functional alcohol (By), the difunctional alcohol (B$_2$) or the difunctional carboxylic acid (C$_2$) without α,β-olefinically unsaturated bonds, and the fatty acid or fatty alcohol used is less than or equal to 4.

8. The detergent or cleaner for textiles according to claim 1, wherein an amount of the α,β-olefinically unsaturated carboxylic acid (A$_2$) is greater than 20 mol %, based on a total amount of carboxylic acids (A$_2$) and (C$_2$).

9. The detergent or cleaner for textiles according to claim 1, wherein the branched polyester is suitable for soil release polymers.

10. The detergent or cleaner for textiles according to claim 1, wherein the branched polyester is suitable for graying inhibitors for textile fabric.

11. The detergent or cleaner for textiles according to claim 10, wherein the textile fabric comprises polyester.

12. The detergent or cleaner for textiles according to claim 4, wherein the tri- or higher-functional alcohol (By) is a sugar or a sugar alcohol, wherein the sugar is glucose, fructose, or sucrose, and the sugar alcohol is sorbitol, mannitol, threitol, erythritol, adonitol (ribitol), arabitol (lyxitol), xylitol, dulcitol (galactitol), maltitol, somalt, or inositol.

13. The detergent or cleaner for textiles according to claim 5, wherein the aliphatic dicarboxylic acid is selected from the group consisting of oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis-cyclohexane-1,2-dicarboxilic acid, trans-cyclohexane-1,2-dicarboxylic acid, cis-cyclohexane-1,3-dicarboxylic acid, trans-cyclohexane-1,3-dicarboxylic acid, cis-cyclohexane-1,4-dicarboxylic acid, trans-cyclohexane-1,4-dicarboxylic acid, cis-cyclopentane-1,2-dicarboxylic acid, trans-cyclopentane-1,2-dicarboxylic acid, cis-cyclopentane-1,3-dicarboxylic acid, and trans-cyclopentane-1,3-dicarboxylic acid, and the aromatic dicarboxylic acid is selected from the group consisting of phthalic acid, isophthalic acid and terephthalic acid.

14. The detergent or cleaner for textiles according to claim 6, wherein the polytetramethylene glycol, poly-1,3-propanediol, and polycaprolactone have a molecular weight of up to 2000 g/mol.

15. The detergent or cleaner for textiles according to claim 1, wherein the reacting comprises reacting with the difunctional alcohol (B$_2$) or the difunctional carboxylic acid (C$_2$) without α,β-olefinically unsaturated bonds.

16. A method of reducing soil redeposition onto a textile comprising washing a textile with a detergent composition 0.1 to 99% by weight of at least one surfactant selected from the group consisting of an anionic surfactant, a nonionic surfactant, an amphoteric surfactant and a cationic surfactant; and comprising branched polyester with sulfonate groups obtained by a process comprising:

reacting an α,β-olefinically unsaturated dicarboxylic acid (A$_2$), a tri- or higher-functional alcohol (By), optionally a difunctional alcohol (B$_2$) or difunctional carboxylic acid (C$_2$) without α,β-olefinically unsaturated bonds, and optionally a fatty acid or fatty alcohol, to obtain an intermediate branched polyester; and subsequently reacting the intermediate branched polyester with hydrogen sulfite, wherein a molar amount of hydrogen sulfite is at most 95 mol %, based on an amount of the α,β-olefinically unsaturated dicarboxylic acid (A$_2$).

* * * * *